US012656516B2

(12) United States Patent
Beitz et al.

(10) Patent No.: US 12,656,516 B2
(45) Date of Patent: **\*Jun. 16, 2026**

(54) HYBRID OCEAN BOTTOM SEISMIC RECEIVER AND STREAMER SEISMIC DATA ACQUISITION USING WIDE TOWED SOURCES

(71) Applicant: PGS Geophysical AS, Oslo (NO)

(72) Inventors: Manuel Beitz, Oslo (NO); Martin Widmaier, Oslo (NO); Andrew Long, Perth (AU)

(73) Assignee: PGS Geophysical AS, Oslo (NO)

( * ) Notice: Subject to any disclaimer, the term of this patent is extended or adjusted under 35 U.S.C. 154(b) by 183 days.

This patent is subject to a terminal disclaimer.

(21) Appl. No.: 18/371,040

(22) Filed: Sep. 21, 2023

(65) Prior Publication Data

US 2024/0012169 A1    Jan. 11, 2024

Related U.S. Application Data

(63) Continuation of application No. 16/892,557, filed on Jun. 4, 2020, now Pat. No. 11,802,986.

(60) Provisional application No. 62/860,470, filed on Jun. 12, 2019.

(51) Int. Cl.
*G01V 1/38* (2006.01)

(52) U.S. Cl.
CPC .......... *G01V 1/3852* (2013.01); *G01V 1/3808* (2013.01); *G01V 2210/1293* (2013.01); *G01V 2210/165* (2013.01)

(58) Field of Classification Search
CPC ............... G01V 1/3852; G01V 1/3808; G01V 2210/1293; G01V 2210/165
See application file for complete search history.

(56) References Cited

U.S. PATENT DOCUMENTS

| | | | | |
|---|---|---|---|---|
| 9,116,257 B2 * | 8/2015 | Pritchard | ............. | G01V 1/3808 |
| 2016/0178776 A1 * | 6/2016 | Bernitsas | ............. | G01V 1/3808 |
| | | | | 367/20 |
| 2017/0176636 A1 * | 6/2017 | Adams | ................... | G01V 3/165 |

OTHER PUBLICATIONS

Subodh Kumar, Sandeep K. Chandola, Shamsul Shukri, Stephen Winters, Bakhtiar Baginda, Nigel Jones, and Michelle Tham. (2017). First Hybrid 3D Seismic Survey in Malaysia: A New Paradigm in Ocean Bottom Seismic. 4 Pages.

\* cited by examiner

*Primary Examiner* — Abdallah Abulaban
(74) *Attorney, Agent, or Firm* — OPWII, LLC

(57) ABSTRACT

Methods for performing a marine survey of a subterranean formation using a hybrid combination of ocean bottom seismic ("OBS") receivers, wide towed sources, and moving streamers are described herein. In one aspect, a sail line separation in a crossline direction is determined based on an average streamer separation and number of streamers. An array of OBS receivers are deposited on a surface of a subterranean formation with an OBS receiver separation that is based on the sail line separation. Wide towed sources and streamers are towed above the array of OBS receivers behind a survey vessel that travels sail lines separated by the sail line separation. The wide towed sources may be activated above the array of OBS receivers. Wavefields reflected from the subterranean formation are recorded at the OBS receivers and receivers located in the streamers as seismic data.

11 Claims, 20 Drawing Sheets

438a  438b  438c  438d  438e  438f  438g  438h

450

522a   522b   522c   522d   522e   522f   522g   522h

1102

| $N_{source}$ \ $k$ | 1 | 2 | 3 | 4 | $\cdots$ |
|---|---|---|---|---|---|
| 2 | $Sep_{OBS} = Sep_{sail}$ <br> $Sep_{source} = Sep_{sail}/2$ | $Sep_{OBS} = 2Sep_{sail}$ <br> $Sep_{source} = Sep_{sail}/2$ | $Sep_{OBS} = 3Sep_{sail}$ <br> $Sep_{source} = Sep_{sail}/2$ | $Sep_{OBS} = 4Sep_{sail}$ <br> $Sep_{source} = Sep_{sail}/2$ | $\cdots$ |
| 3 | $Sep_{OBS} = Sep_{sail}$ <br> $Sep_{source} = Sep_{sail}/3$ | $Sep_{OBS} = 2Sep_{sail}$ <br> $Sep_{source} = Sep_{sail}/3$ | $Sep_{OBS} = 3Sep_{sail}$ <br> $Sep_{source} = Sep_{sail}/3$ | $Sep_{OBS} = 4Sep_{sail}$ <br> $Sep_{source} = Sep_{sail}/3$ | $\cdots$ |
| 4 | $Sep_{OBS} = Sep_{sail}$ <br> $Sep_{source} = Sep_{sail}/4$ | $Sep_{OBS} = 2Sep_{sail}$ <br> $Sep_{source} = Sep_{sail}/4$ | $Sep_{OBS} = 3Sep_{sail}$ <br> $Sep_{source} = Sep_{sail}/4$ | $Sep_{OBS} = 4Sep_{sail}$ <br> $Sep_{source} = Sep_{sail}/4$ | $\cdots$ |
| $\vdots$ | $\vdots$ | $\vdots$ | $\vdots$ | $\vdots$ | |

| $N_{source}$ \ $k$ | 1 | 2 | 3 | 4 | $\cdots$ |
|---|---|---|---|---|---|
| 2 | $Sep_{sail} = Sep_{OBS}$ <br> $Sep_{source} = Sep_{OBS}/2$ | $Sep_{sail} = Sep_{OBS}/2$ <br> $Sep_{source} = Sep_{OBS}/4$ | $Sep_{sail} = Sep_{OBS}/3$ <br> $Sep_{source} = Sep_{OBS}/6$ | $Sep_{sail} = Sep_{OBS}/4$ <br> $Sep_{source} = Sep_{OBS}/8$ | $\cdots$ |
| 3 | $Sep_{sail} = Sep_{OBS}$ <br> $Sep_{source} = Sep_{OBS}/3$ | $Sep_{sail} = Sep_{OBS}/2$ <br> $Sep_{source} = Sep_{OBS}/6$ | $Sep_{sail} = Sep_{OBS}/3$ <br> $Sep_{source} = Sep_{OBS}/9$ | $Sep_{sail} = Sep_{OBS}/4$ <br> $Sep_{source} = Sep_{OBS}/12$ | $\cdots$ |
| 4 | $Sep_{sail} = Sep_{OBS}$ <br> $Sep_{source} = Sep_{OBS}/4$ | $Sep_{sail} = Sep_{OBS}/2$ <br> $Sep_{source} = Sep_{OBS}/8$ | $Sep_{sail} = Sep_{OBS}/3$ <br> $Sep_{source} = Sep_{OBS}/12$ | $Sep_{sail} = Sep_{OBS}/4$ <br> $Sep_{source} = Sep_{OBS}/16$ | $\cdots$ |
| $\vdots$ | $\vdots$ | $\vdots$ | $\vdots$ | $\vdots$ | |

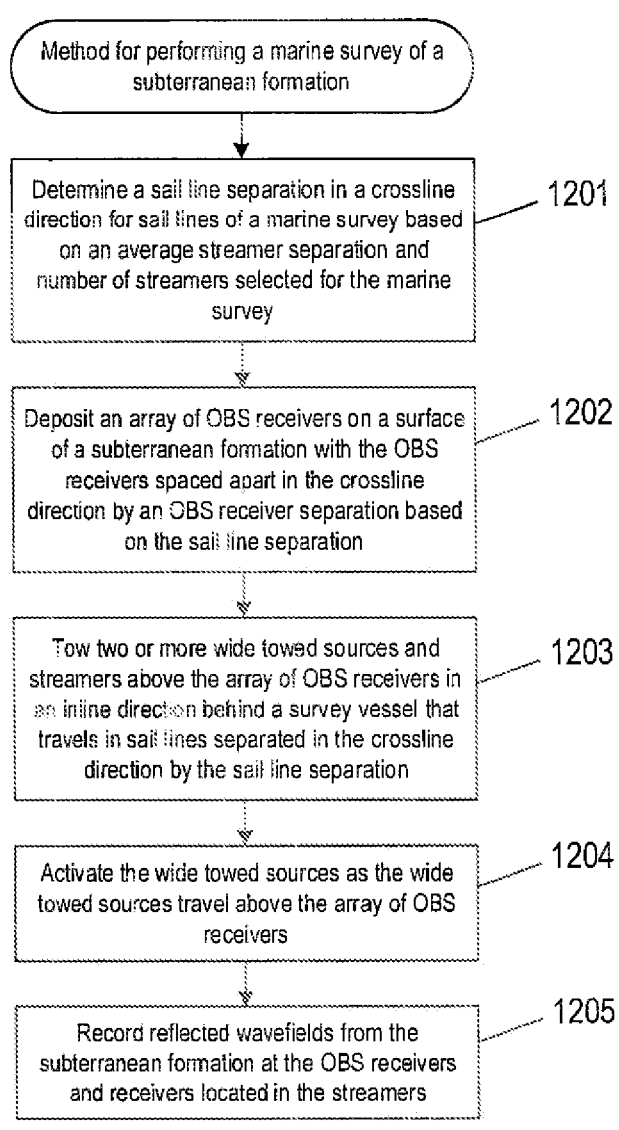

Method for performing a marine survey of a subterranean formation

Determine a sail line separation in a crossline direction for sail lines of a marine survey based on an average streamer separation and number of streamers selected for the marine survey — 1201

Deposit an array of OBS receivers on a surface of a subterranean formation with the OBS receivers spaced apart in the crossline direction by an OBS receiver separation based on the sail line separation — 1202

Tow two or more wide towed sources and streamers above the array of OBS receivers in an inline direction behind a survey vessel that travels in sail lines separated in the crossline direction by the sail line separation — 1203

Activate the wide towed sources as the wide towed sources travel above the array of OBS receivers — 1204

Record reflected wavefields from the subterranean formation at the OBS receivers and receivers located in the streamers — 1205

FIG. 12

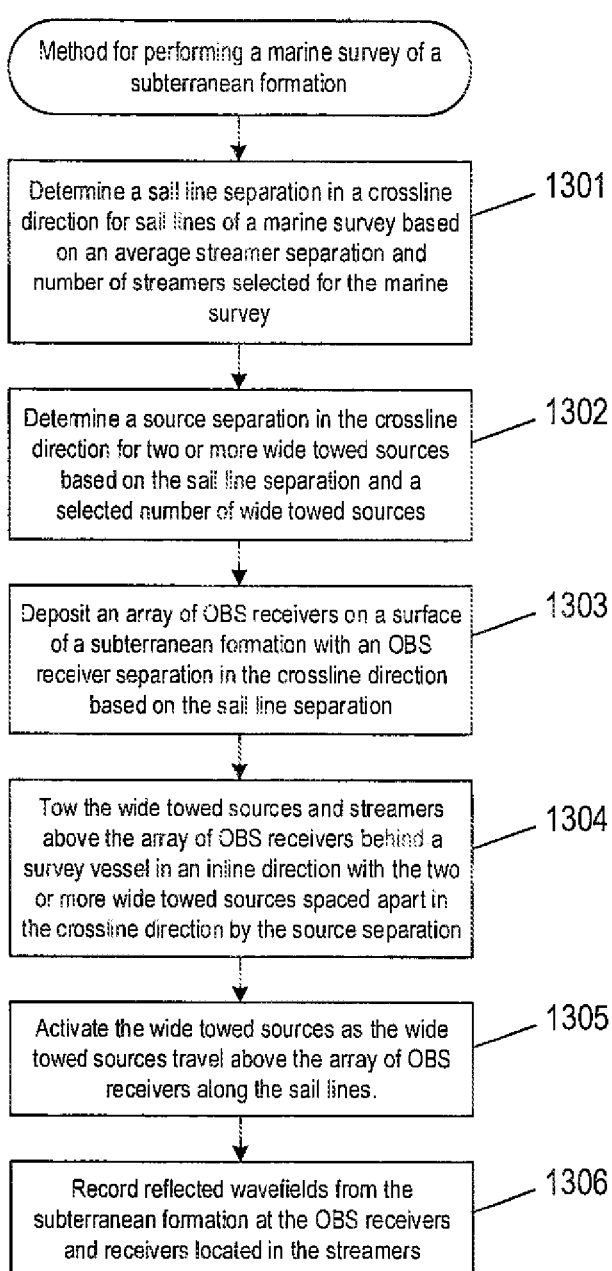

Method for performing a marine survey of a subterranean formation

Determine a sail line separation in a crossline direction for sail lines of a marine survey based on an average streamer separation and number of streamers selected for the marine survey — 1301

Determine a source separation in the crossline direction for two or more wide towed sources based on the sail line separation and a selected number of wide towed sources — 1302

Deposit an array of OBS receivers on a surface of a subterranean formation with an OBS receiver separation in the crossline direction based on the sail line separation — 1303

Tow the wide towed sources and streamers above the array of OBS receivers behind a survey vessel in an inline direction with the two or more wide towed sources spaced apart in the crossline direction by the source separation — 1304

Activate the wide towed sources as the wide towed sources travel above the array of OBS receivers along the sail lines. — 1305

Record reflected wavefields from the subterranean formation at the OBS receivers and receivers located in the streamers — 1306

FIG. 13

HYBRID OCEAN BOTTOM SEISMIC RECEIVER AND STREAMER SEISMIC DATA ACQUISITION USING WIDE TOWED SOURCES

CROSS-REFERENCE TO RELATED APPLICATIONS

This application is a continuation of application Ser. No. 16/892,557, filed Jun. 4, 2020, which claims the benefit of Provisional Application 62/860,470, filed Jun. 12, 2019, which application is hereby incorporated by reference as if entirely set forth herein.

BACKGROUND

Marine seismology companies invest heavily in the development of marine seismic surveying equipment and seismic data processing techniques in order to obtain accurate, high-resolution images of subterranean formations located beneath a body of water. Such images may be used, for example, to determine the structure of subterranean formations, to discover petroleum reservoirs, and to monitor petroleum reservoirs during production. A marine seismic survey may be performed with one or more survey vessels that tow one or more seismic sources and many streamers through the body of water. The survey vessel contains seismic acquisition equipment, such as navigation control, seismic source control, seismic receiver control, and recording equipment. A seismic source control controls activation of the one or more seismic sources at selected times or locations. A seismic source comprises an array of airguns, or one or more marine vibrators, that are activated to produce acoustic energy that spreads out in all directions. A portion of the acoustic energy travels down through the water and into a subterranean formation to propagate as sound waves within the subterranean formation. At each interface between different types of liquid, rock and sediment, a portion of the acoustic energy is refracted, a portion is transmitted, and another portion is reflected into the body of water to propagate as an acoustic reflected wavefield toward the water surface. The streamers are elongated spaced apart cable-like structures towed behind a survey vessel in the direction the survey vessel is traveling, which is also called the "inline direction." Each streamer contains many seismic receivers or sensors that measure pressure wavefield and/or particle motion wavefield properties of the reflected wavefield. The streamers collectively form a seismic data acquisition surface that records the pressure and/or particle motion wavefields as seismic data in the recording equipment.

Marine surveys may also be performed with a survey vessel that tows a seismic source above ocean bottom seismic ("OBS") receivers located in ocean bottom cables ("OBCs") or ocean bottom nodes ("OBNs") deployed on the surface of the subterranean formation. OBCs include spaced apart receivers (e.g., geophones and/or hydrophones) that are electronically connected by transmission cables to recording equipment located elsewhere, such as on board a recording survey vessel. OBNs are positioned on the seafloor using a variety of methods, for example, remotely operated underwater vehicles. Each OBN is equipped with a battery, a clock, and a receiver (e.g., geophone). Because OBCs are often tethered to a recording survey vessel, OBCs are typically deployed in shallow water areas such as water depths that are less than one kilometer. On the other hand, because OBNs have their own power supply and are not tethered to a recording survey vessel, OBNs may be deployed for long periods of time, such as weeks or months, and at depths greater than one kilometer. A line of OBNs may also be uniformly spaced apart along cable called "nodes on a rope." Nodes on a rope enable efficient deployment of OBNs that are uniformly spaced apart on the ocean bottom and enable efficient retrieval of OBNs from the ocean bottom. The acoustic energy generated by the source is reflected and refracted from the seafloor and interfaces between layers of different densities within the subterranean formation and is recorded by the receivers of the OBCs or OBNs as seismic data that is sent to a recording survey vessel.

DESCRIPTION OF THE DRAWINGS

FIG. 11A shows a table that summarizes relationships between OBS receiver separations and source separations in the crossline direction for a selected sail line separation.

FIG. 11B shows a table that summarizes relationships described above between sail line separation and source separations in the crossline direction for a selected OBS receiver separation.

FIG. 12 shows a method for performing a marine survey of a subterranean formation located beneath a body of water.

FIG. 13 shows a method for performing a marine survey of a subterranean formation located beneath a body of water.

DETAILED DESCRIPTION

Figure 1A:
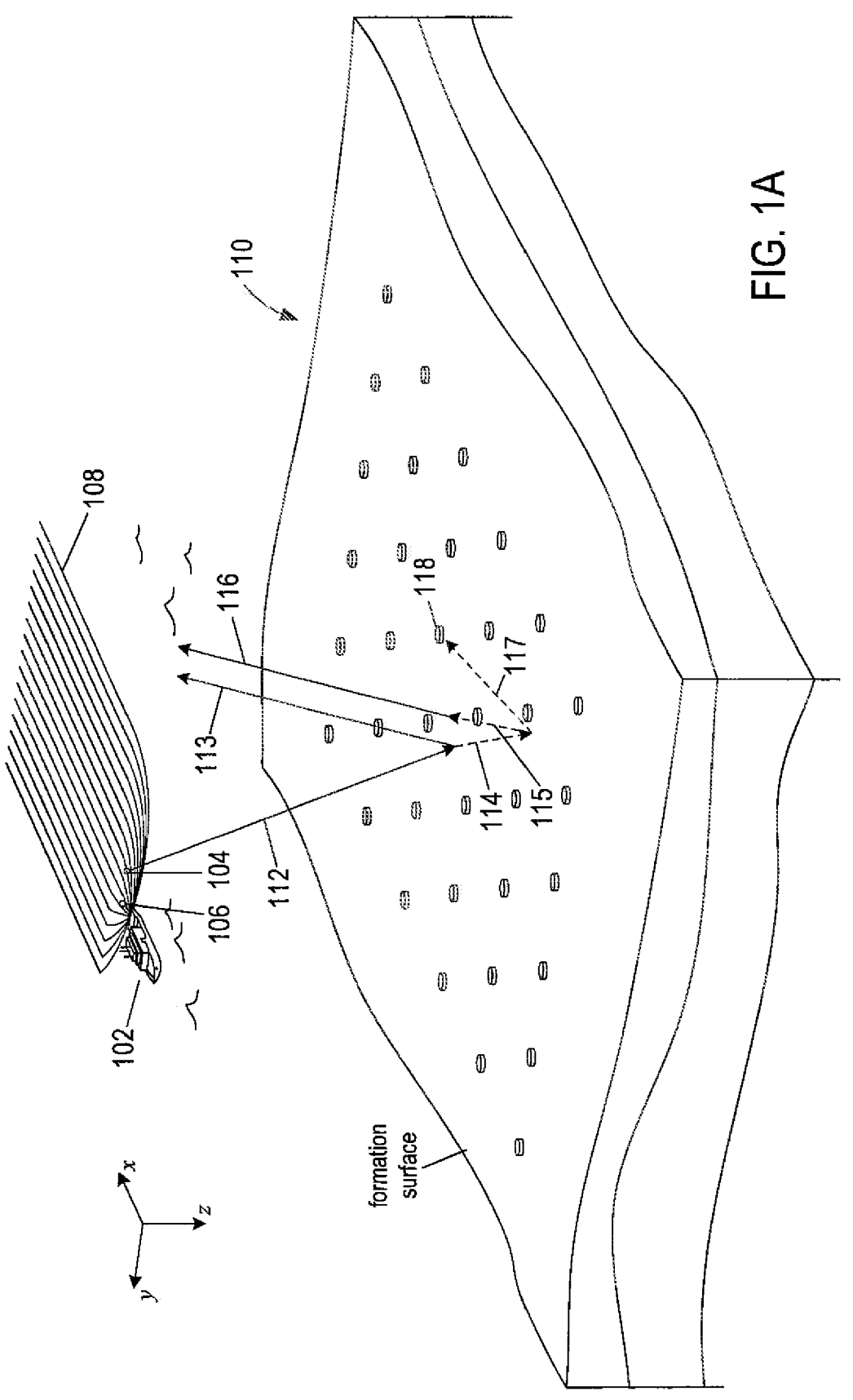
FIGS. 1A-1B show examples of hybrid streamer and ocean bottom seismic ("OBS") surveys performed using two wide towed sources.

OBS surveys and towed streamers surveys have different advantages in the search for hydrocarbon deposits and in monitoring hydrocarbon deposits under production. For example, OBS surveys have much longer source/receiver offsets and a wide range of azimuths, ranging from narrow azimuth ("NAZ") surveys to full azimuth ("FAZ") surveys. By contrast, towed streamer surveys have denser receiver spacing and smaller source/receiver offsets. However, combining seismic data sets obtained from a towed streamer survey and an OBS survey of the same subterranean formation to produce images of the subterranean formation is challenging because of the inherent differences in the way in which the seismic data sets are obtained. For example, the seismic data sets are typically recorded for different symmetries of source and reflected wavefield travel paths, different receiver depths, and the source/receiver ghost travel times are different for the two data sets. In addition, OBS surveys are performed with densely spaced source activation locations over a large survey area in order to increase fold. On the other hand, towed steamer surveys record seismic data over a large survey area but with sparsely spaced sail lines.

The inventors have observed that many of the challenges associated with combining seismic data obtained from traditional towed streamer surveys and traditional OBS surveys may be attributed to non-uniform and misaligned streamer and OBS receiver sublines. A streamer subline is a line of common midpoints ("CMPs") for a particular source and the receivers located along a particular streamer. An OBS receiver subline is a line of CMPs for a particular source and the receivers located along a particular linear arrangement of OBS receivers. Another factor that facilitates combining seismic data recorded in a hybrid OBS receiver and towed streamer survey as described herein is that the receivers in the streamers and the OBS receivers record the same source and reflected wavefields. In other words, the receiver located in the streamers and the OBS receiver located on the water bottom form a receiver space for recording the same source and reflected wavefields.

Hybrid marine seismic surveys described herein are performed with a survey vessel towing an array of wide towed sources and multiple streamers above an array of OBS receivers (i.e., OBC receivers or OBNs) distributed over the surface of a subterranean formation. For typical towed streamers surveys performed with two or more sources, the two or more sources are towed within the separation distance of the two innermost streamers. Wide towed sources, by contrast, are towed with source separations that exceed the separation distances between adjacent streamers. The sail line separation, source separation, and OBS receiver separation are selected so that seismic data is recorded with nominally uniform streamer and OBS receiver subline separations. For example, the sail line separation may be chosen as a function of the number of streamers and the average streamer separation; the source separation may be chosen as a function of the sail line separation and the number of sources; and the streamer survey may be performed over an array of OBS receivers that are uniformly distributed over the surface of the subterranean formation with the OBS receiver separation selected as a function of the sail line separation.

The seismic data recorded by OBS receivers may be processed separately to build a high-resolution velocity model of a subterranean formation. A velocity model is a precondition for seismic migration and other seismic imaging methods to map subsurface reflectors and scatters using reflected or scattered waves. Techniques for building a velocity model of a subterranean formation from the seismic data recorded by OBS receivers include full-waveform inversion. The high-resolution velocity model includes contributions from all azimuths, includes anisotropic effects, and provides high resolution of velocities in subterranean formations with complex geologies. Time or depth migration may be used to generate images of the subterranean formation based on the seismic data recorded by receivers in the towed streamers and the velocity model built from the seismic data recorded using the OBS receivers.

Hybrid Marine Surveying with Towed Steamers, Wide Towed Sources, and OBS Receivers In the follow description, the terms "uniform," "equal," and "aligned" are used to describe distances between adjacent sail lines, source trajectories, and OBS receiver separations and parameters associated with configurations of sources, streamers, sublines, and OBS receivers. These terms imply exactness and precision regarding the parameters used to describe and illustrate example sail lines and configurations of sources, streamers, sublines, and OBS receivers in examples of marine surveys described below. However, it should be recognized that marine surveys are performed under dynamic real-world conditions, such as changing weather conditions and changing water currents, that cause the shape of streamers to vary and distances between adjacent sail lines, adjacent streamers and adjacent sources to deviate from intended or idealized locations. Therefore, the terms "uniform," "equal," and "aligned" in the following discussion also mean "substantially or approximately uniform." "approximately equal," and "substantially or approximately aligned" to describe distances between adjacent sail lines, source trajectories, and OBS receiver separations and configurations of sources, streamers, sublines, and OBS receivers.

Figure 1B:
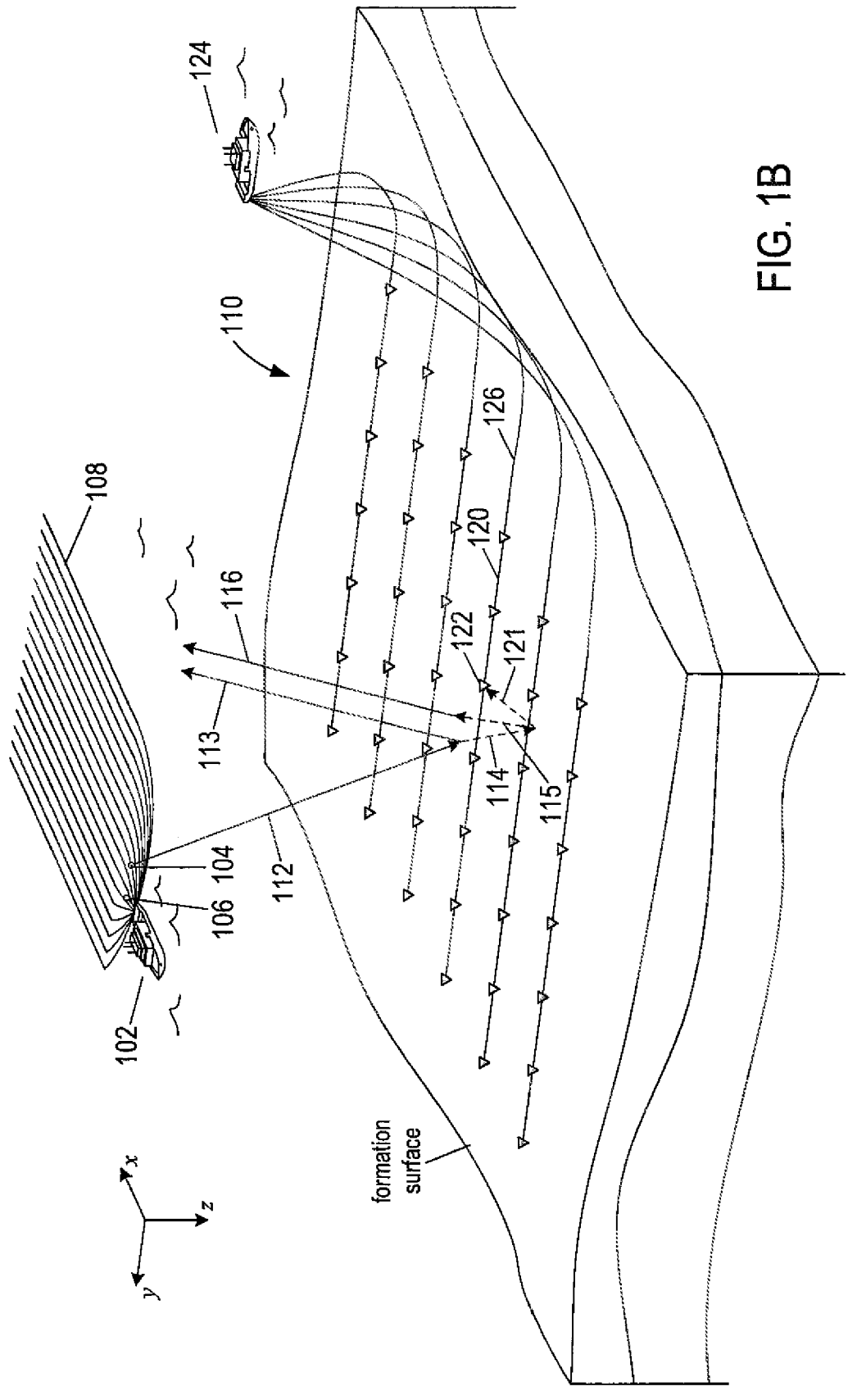

FIGS. 1A-1B show examples of hybrid streamer and OBS surveys. In FIGS. 1A-1B, a survey vessel 102 tows two sources 104 and 106 and a set of sixteen streamers, such as streamer 108, through a body of water above a subterranean formation 110. The body of water can be, for example, an ocean, a sea, a lake, a river, or any portion thereof. The sources 104 and 106 may be an array of airguns or one or more marine vibrators that generate source wavefields that spread spherically outward in all directions. Ray paths 112 and 113 represent a portion of a source wavefield that is reflected upward from the surface of the subterranean formation 110 toward the steamers. Ray paths 114-116 represents acoustic energy that penetrates the subterranean formation 110, is refracted and reflected upward from an interface of the subterranean formation 110 and propagates toward the streamers.

In the example implementation of FIG. 1A, shaded disks represent OBNs positioned on the surface of the subterranean formation 110. Ray path 117 represents a portion of the acoustic energy that penetrates the subterranean formation and is reflected upward from the interface toward an OBN 118. Seismic data recorded by the OBNs may be recovered by retrieving the OBNs and transferring the seismic data in recording equipment located onshore or onboard a vessel used to retrieve the OBNs. Alternatively, the OBNs may transmit, over a suitable medium, the recorded seismic data that is in turn recorded by recording equipment located onboard the survey vessel 102.

In the example implementation of FIG. 1B, OBCs, such as OBC 120, are located on the surface of the subterranean formation 110. Triangles represent regularly spaced receivers in the OBCs. Ray path 121 represents a portion of the acoustic energy that penetrated the subterranean formation 110 and is reflected upward toward a receiver 122. Each OBC may be electronically connected via a data transmission cable to recording equipment located onboard a recording survey vessel 124. For example, a transmission cable 126 electronically transmits seismic data generated by the receivers located along the OBC 120 to recording equipment located onboard the recording survey vessel 124.

FIGS. 1A-1B show a Cartesian coordinate system with three perpendicular coordinate axes labeled x, y, and z. The coordinate system specifies orientations and coordinate locations within the body of water and subterranean formation. The x-axis specifies the position of a point in a direction parallel to the length of the streamers or in the direction the survey vessel is traveling and is referred to as the "inline" direction. The y-axis specifies the position of a point in a direction perpendicular to the x-axis and substantially parallel to the free surface of the body of water and is referred to as the "crossline" direction. The z-axis, also referred to as "depth," specifies the position of a point perpendicular to the xy-plane (i.e., perpendicular to the free surface) with the positive z-axis pointing downward away from the free surface.

Figure 2A:
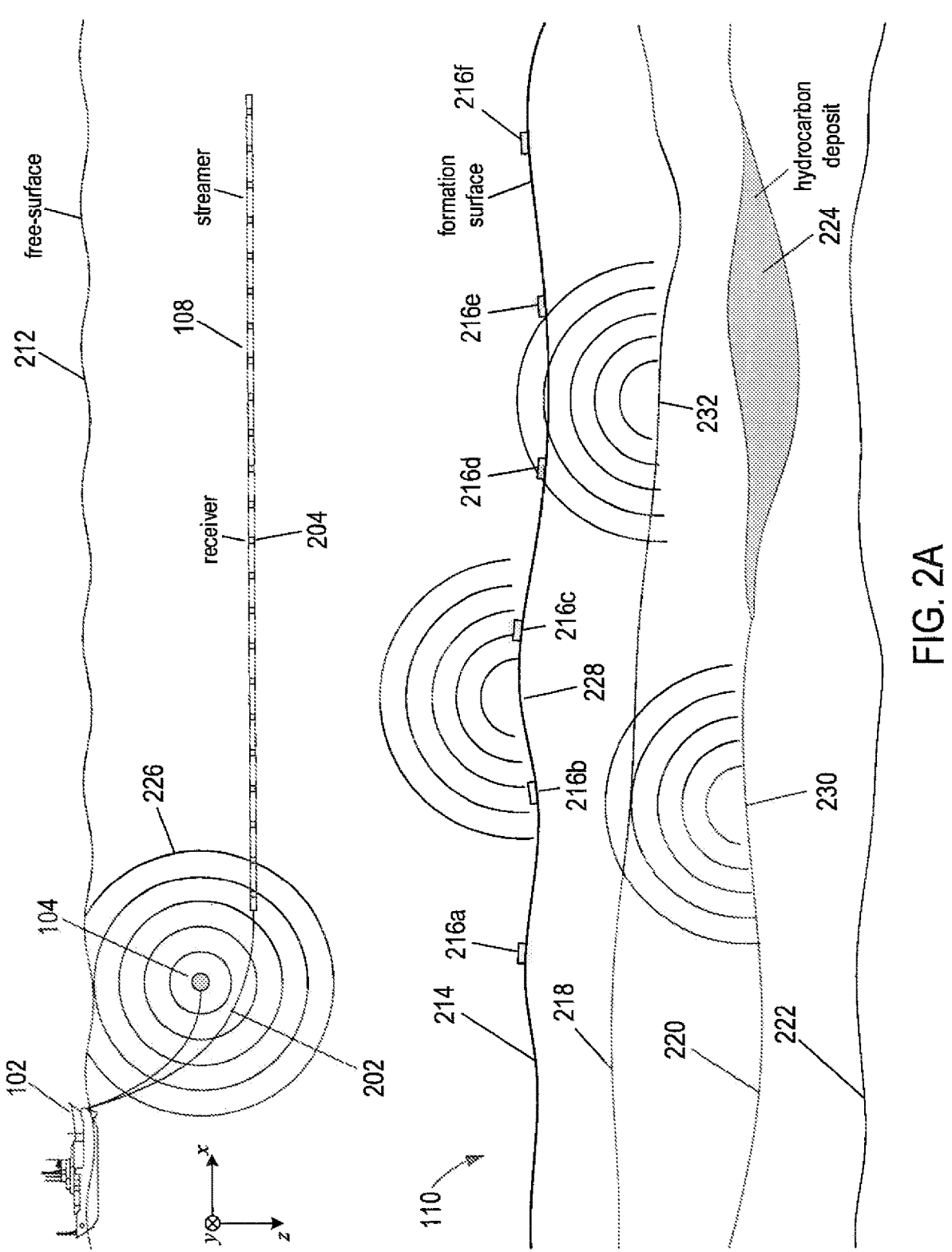
FIGS. 2A-2B show a side-elevation view and a top view, respectively, of the seismic data acquisition systems shown in FIGS. 1A-1B.
Figure 2B:
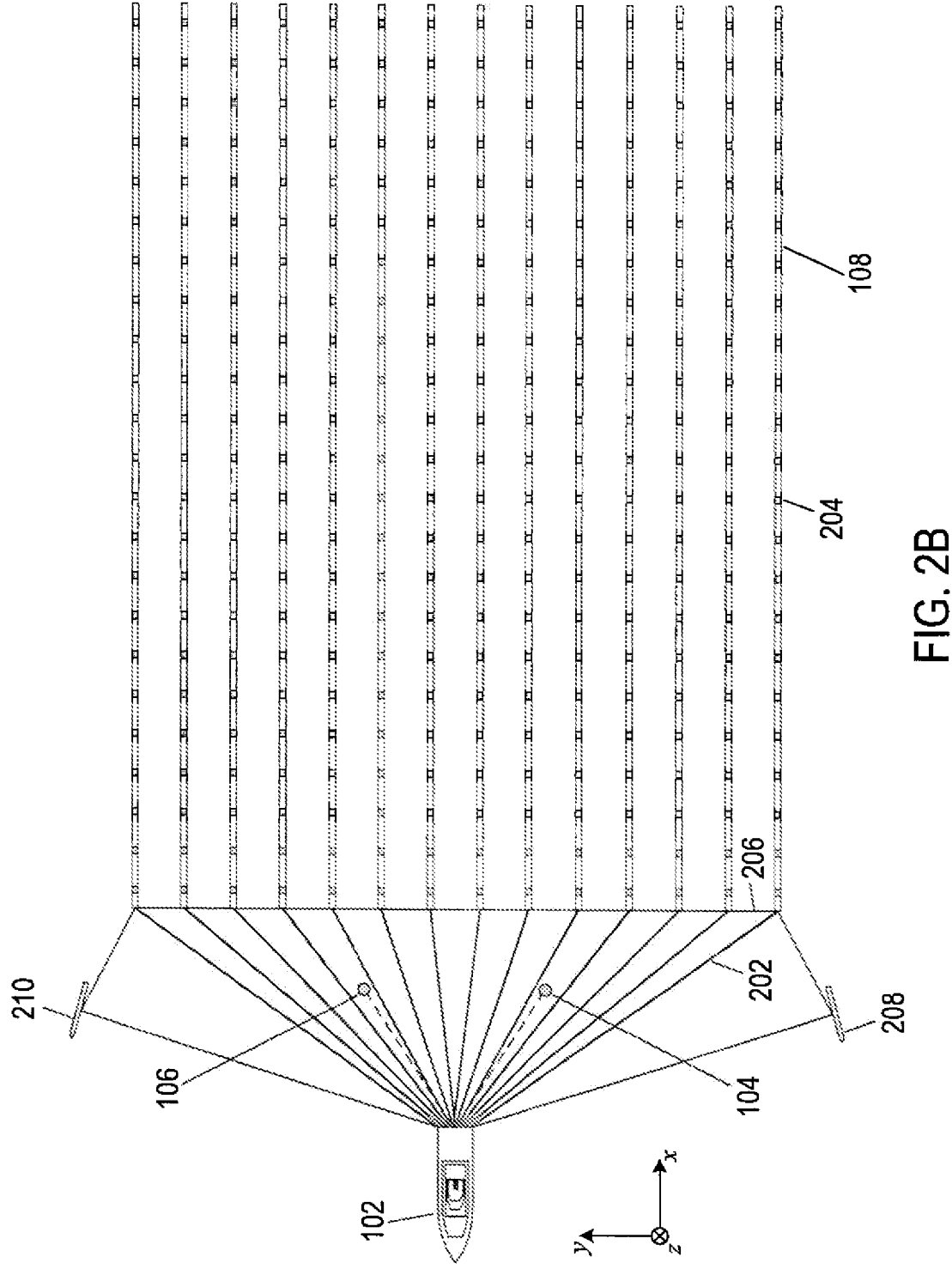

FIGS. 2A-2B show a side-elevation view and a top view, respectively, of the seismic data acquisition systems shown in FIGS. 1A-1B. As shown in FIG. 2B, the survey vessel 102 tows sixteen streamers. Each streamer is attached at one end to the survey vessel 102 via a streamer-data-transmission cable, such as a transmission cable 202 that connects the streamer 108 to the survey vessel 102. The streamers are long cables containing power and data-transmission lines that connect spaced apart receivers represented by shaded rectangles, such as receiver 204, to seismic data acquisition equipment, computers, and data-storage devices located onboard the survey vessel 102. Adjacent streamers are connected by cables, such as cable 206, to maintain equal streamer separation behind the survey vessel 102 while the streamers are pulled in opposite crossline directions by lateral paravanes 208 and 210. Buoys (not shown) may be attached at the tail ends of the streamers for visibility, to aid in GPS location determination, and/or to help maintain the orientation and depth of the streamers below the free surface of the body of water.

The streamers may be towed to form a planar horizontal seismic data acquisition surface with respect to the free surface. However, in practice, the streamers may be smoothly varying due to active sea currents and weather conditions. A seismic data acquisition surface is not limited to the parallel streamers shown in FIGS. 1A, 1B, and 2B. In other implementations, the streamers may be towed with progressively larger streamer separation in the crossline direction toward longer distances from the survey vessel 102 in a process called "streamer fanning." Streamer fanning spreads the streamers farther apart with increasing distance from the survey vessel in the inline direction. Streamer fanning may improve coverage at far source/receiver offsets without compromising seismic data resolution or seismic data quality and may also increase acquisition efficiency by reducing seismic data infill. In still other implementations, the streamers may be towed with a downward slant with increasing distance from the survey vessel. A seismic data acquisition surface is not limited to sixteen streamers as shown in FIGS. 1A, 1B, and 2B. In practice, the number of streamers used to form a seismic data acquisition surface can range from as few as one streamer to as many as 20 or more streamers.

In FIG. 2A, the survey vessel 102 tows the sixteen streamers below the free surface 212 of the body of water. Curve 214 represents a top surface of the subterranean formation 110 located at the bottom of the body of water. Shaded boxes 216a-216f are OBS receivers that represent the receivers of OBNs positioned on the formation surface 214, as shown in FIG. 1A, or represent the receivers of OBCs laid on the formation surface 214, as shown in FIG. 1B. The subterranean formation 110 may have many subterranean layers of sediment and rock. Curves 218, 220, and 222 represent interfaces between subterranean layers of different compositions. A shaded region 224 represents a subterranean hydrocarbon deposit, the depth and positional coordinates of which may be determined, at least in part, by processing the seismic data recorded during a marine seismic survey. As the survey vessel 102 moves over the subterranean formation 110, the seismic source 104 produces acoustic energy in the form of a source wavefield that spreads out in all directions away from the seismic source 104. For the sake of simplicity, FIG. 2A shows an outwardly expanding source wavefield 226 represented in vertical plane cross section by circles of increasing radius centered at the source 104. Any portion of the source wavefield 226 reflected downward from the free surface 212 is called the "source ghost wavefield." The source wavefield eventually reaches the formation surface 214, at which point the wavefield may be partially reflected from the formation surface 214 and partially refracted downward into the subterranean formation 110, becoming elastic waves within the subterranean formation 110. In the body of water, the source wavefield 226 comprises compressional pressure waves, or P-waves, while in the subterranean formation 110, the elastic waves include P-waves and transverse waves, or S-waves. Within the subterranean formation 110, at each interface between different types of materials or at discontinuities in density or in one or more of various other physical characteristics or parameters, downward propagating elastic waves may be partially reflected and partially refracted. As a result, each point of the formation surface 214 and each point of the interfaces 218, 220, and 222 may be a reflector that becomes a potential secondary point source from which acoustic and elastic wave energy, respectively, may emanate upward toward the receivers located on the formation surface 214 and receivers located in the streamers 108. As shown in FIG. 2A, waves of significant amplitude may be generally reflected from points on or close to the formation surface 214, such as point 228, and from points on or very close to interfaces in the subterranean formation 110, such as points 230 and 232.

The waves comprising a reflected wavefield may be generally reflected at different times within a range of times following the generation of a source wavefield. A point on the formation surface 214, such as the point 228, may receive a pressure disturbance from the source wavefield more quickly than a point within the subterranean formation 110, such as points 230 and 232. Similarly, a point on the formation surface 214 directly beneath the source 104 may receive the pressure disturbance sooner than a more distant-lying point on the formation surface 214. Thus, the times at which waves are reflected from various points within the subterranean formation 110 may be related to the distance, in three-dimensional space, of the points from the activated source.

Each receiver of the streamers may include a particle motion sensor and a pressure sensor. A pressure sensor detects variations in water pressure over time. The term "particle motion sensor" is a general term used to refer to a sensor that may be configured to detect particle displacement, particle velocity, or particle acceleration over time. The streamers and the survey vessel 102 may include sensing electronics and data-processing, and/or recording facilities that allow seismic data generated by each receiver to be correlated with the time each airgun is activated, absolute positions on the free surface 212, and absolute three-dimensional positions with respect to an arbitrary three-dimensional coordinate system. The pressure wavefield and particle motion wavefield may be stored at the receiver and/or may be sent along the streamers and data transmission cables to the survey vessel 102, where the data may be stored electronically, magnetically, or optically on data-storage devices located onboard the survey vessel 102 and or transmitted onshore to data-storage devices located in a seismic data-processing facility.

A marine survey is performed with a survey vessel that tows an array of sources and numerous streamers in regularly spaced sail lines above an array of uniformly distributed OBS receivers disposed on the surface of a subterranean formation. The distance between adjacent sail lines, called the "sail line separation," may be related to the number of streamers towed by the survey vessel and average streamer separation as follows:

$$Sep_{sail} = n \times Sep_{stream} \times N_{stream} \qquad (1)$$

where

> $Sep_{sail}$ is the sail line separation:
> $Sep_{stream}$ is the average streamer separation at the shortest source/receiver offsets (i.e., distance between adjacent streamers closest to the survey vessel);
> $N_{stream}$ is the number of streamers towed by the survey vessel; and
> n is a streamer spread factor (i.e., $0 < n \le 1$).

The streamer spread is the crossline distance between the outermost streamers towed by the survey vessel and is given by $Sep_{stream}$ ($N_{stream}-1$). The streamer spread factor is the fraction of overlap between streamer spreads in the region between adjacent sail lines, where a streamer spread factor of zero corresponds to no overlap and a streamer spread factor of one corresponds nearly total overlap. For a uniform source separation in the crossline direction, the source separation between wide towed sources is $Sep_{source}=Sep_{sail}/N_{source}$, where $N_{source}$ is the number of sources. In other words, the separation between wide towed sources depends on the sail line separation divided by the number of sources. For two or more wide towed sources, the source separation between adjacent sources in the crossline direction is greater than the streamer separation (i.e., $Sep_{source} > Sep_{stream}$).

Figure 3:
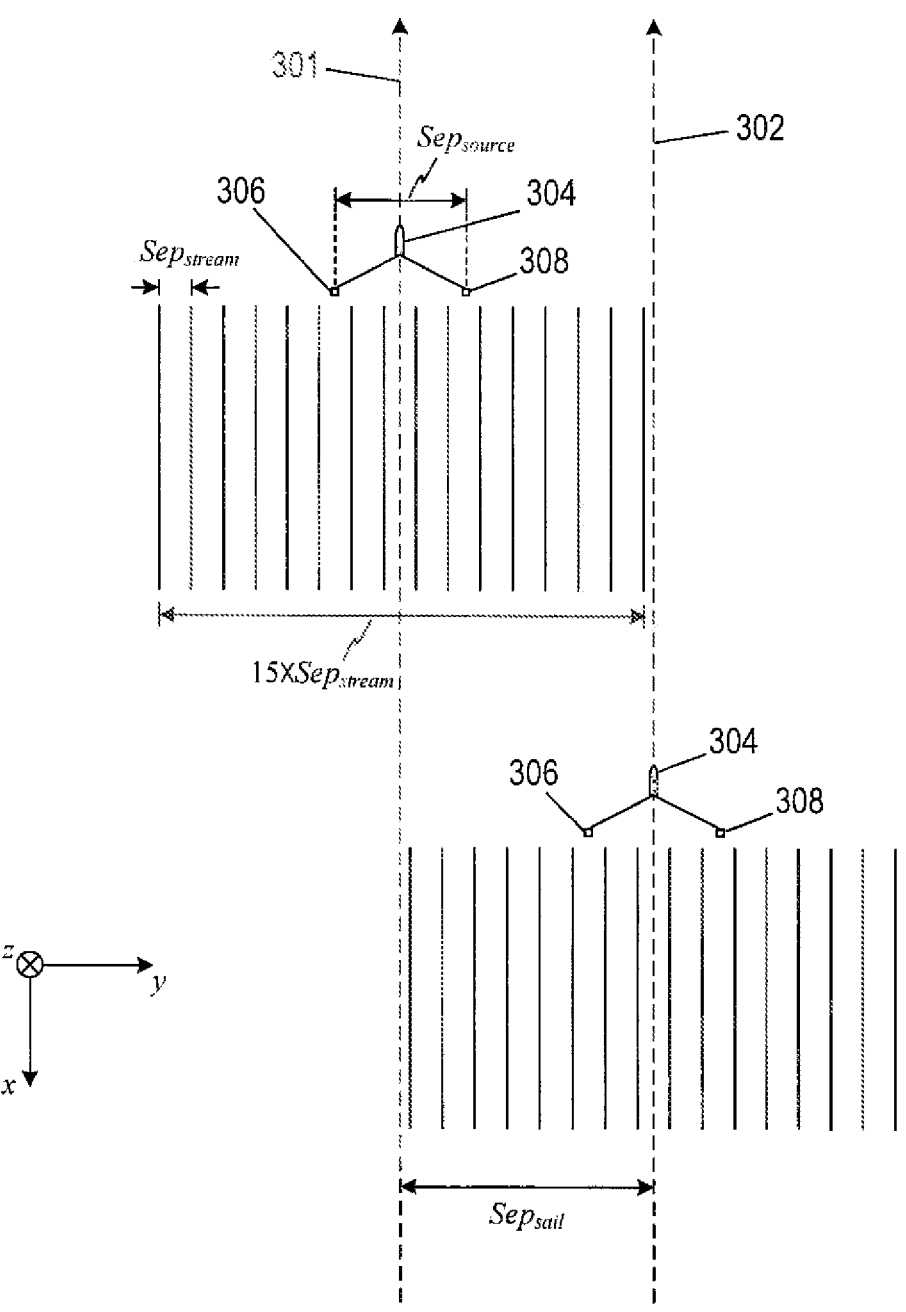
FIG. 3 shows a plan view of an example survey vessel towing two wide towed sources and sixteen streamers along adjacent sail lines at different times in a marine survey.

FIG. 3 shows a plan view (xy-plane) of an example survey vessel towing two wide towed sources (i.e., $N_{source}=2$) and sixteen streamers (i.e., $N_{stream}=16$) along adjacent sail lines at different times in a marine survey. Dot-dashed lines 301 and 302 represent adjacent sail lines traveled by a survey vessel 304 towing two wide towed sources 306 and 308 and sixteen streamers at different times during the survey. In this example, the streamer spread is $15 \times Sep_{stream}$ and the selected streamer spread factor is n=0.5, which corresponds a streamer spread overlap of about 50% and a sail line separation of $Sep_{sail}=0.5 \times Sep_{stream} \times N_{stream}$. For a streamer overlap of about 50%, the area between the sail lines 301 and 302 is covered twice by different halves of the streamers during the marine survey. For example, as the survey vessel 304 travels the sail line 301, half of the streamers cover the area between the sail lines 301 and 302. As the survey vessel 304 travels the sail line 302 later in the survey, the other half of the streamers cover the same area between the sail lines 301 and 302. The source separation between the two wide towed sources 304 and 306 in the crossline direction is $Sep_{source}=Sep_{sail}/2$.

An array of OBS receivers are disposed on the surface of a subterranean formation with an OBS receiver separation given by $Sep_{OBS}=k \times Sep_{sail}$, where k is a natural number (i.e., k>0). Because the sail line separation also equals the crossline source separation multiplied by the number of sources (i.e., $Sep_{sail}=N_{source} \times Sep_{source}$), the crossline OBS receiver separation is related to the crossline source separation by $Sep_{OBS}=k \times (N_{source} \times Sep_{source})$. The crossline source separation may be chosen based on a selected crossline OBS receiver separation given by $Sep_{source}=Sep_{OBS}/(k \times N_{source})$. A streamer subline is a line of CMPs in the inline direction traveled by a source and the receivers located along a streamer. An OBS receiver subline is a line of CMPs in the inline direction of a source towed by a survey vessel and the OBS receivers aligned in the inline direction. The sail line separation ($Sep_{sail}$), source separation ($Sep_{source}$), and OBS receiver separation ($Sep_{OBS}$) are selected as described below with reference to examples shown in FIGS. 4A-7 so that the streamer sublines and the OBS receiver sublines are substantially parallel and uniformly spaced apart and in the crossline direction.

FIGS. 4A-4E show an example of a sail line separation, source separation, and an OBS receiver separation selected for a marine survey performed with a survey vessel towing two wide towed sources and sixteen streamers to obtain parallel uniformly spaced streamer sublines and parallel uniformly spaced OBS receiver sublines in the crossline direction. The streamer spread factor in the sail line separation is n=0.5, which gives approximately 50% overlap of streamer spreads in the area between adjacent sail lines as described above with reference to FIG. 3.

Figure 4A:
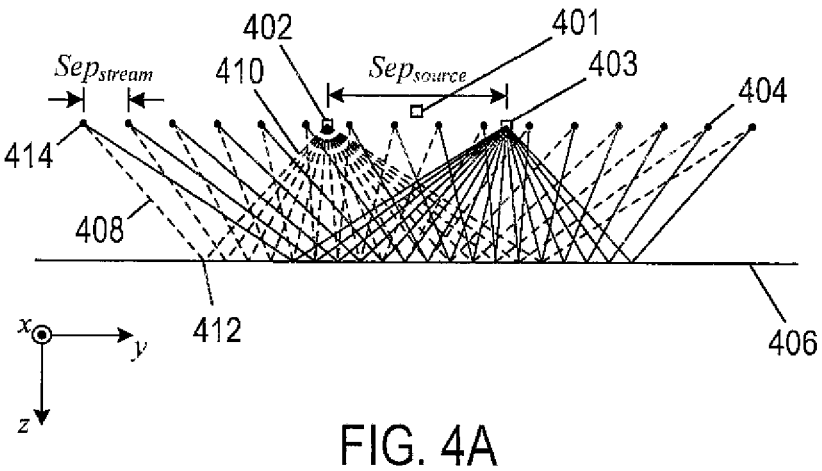
FIGS. 4A-4E show an example of a marine survey performed with two wide towed sources and sixteen streamers to obtain uniformly spaced sublines.

FIG. 4A shows a front or rear (yz-plane) view of a survey vessel 401, two wide towed sources 402 and 403, and sixteen streamers represented by a row of dots. For example, dot 404 represents an yz-plane view of a streamer. Line 406 represents a hypothetical horizontal reflector in the xy-plane. Dashed line ray paths represent acoustic energy generated by the source 402 and reflected from points on the horizontal reflector 406 with CMPs located halfway between the source 402 and receivers located in streamers. A CMP is given by $\vec{x}_m = (\vec{x}_s + \vec{x}_r)/2$, where $\vec{x}_r$ is a receiver coordinate $(x_r, y_r)$ at the free surface and $\vec{x}_s$ is a source coordinate $(x_s, y_s)$ at the free surface. For example, dashed-line ray paths 408 and 410 represent acoustic energy reflected from a point 412 on the horizontal reflector with a CMP located halfway between the source 4012 and a receiver in the steamer 414. Sold-line ray paths represent acoustic energy generated by the source 403 and reflected from points on the horizontal reflector 406 with CMPs located halfway between the source 403 and receivers located in the streamers.

Figure 4B:
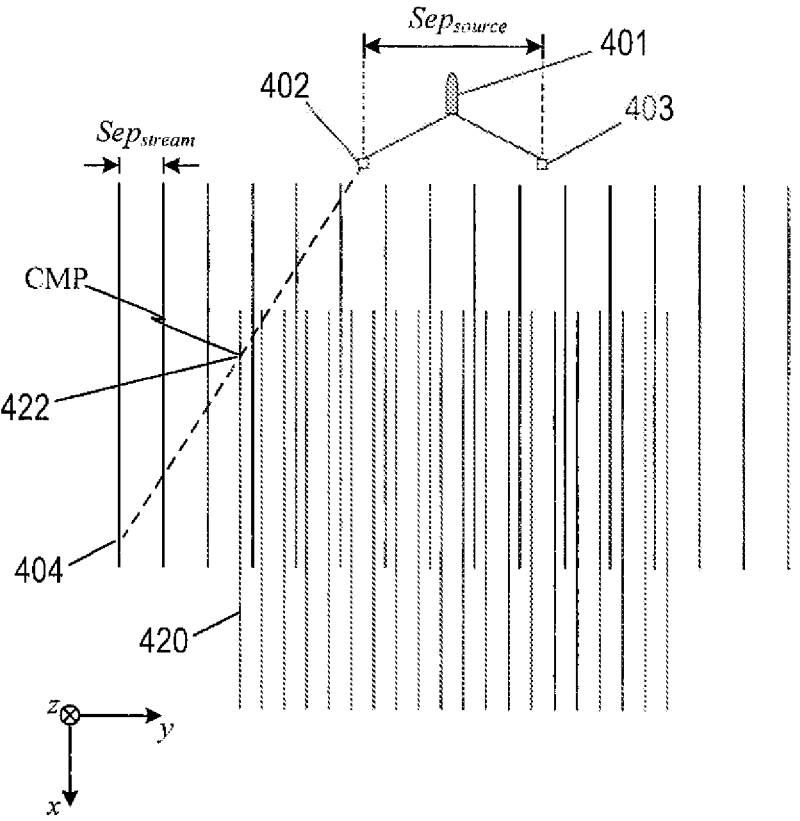

FIG. 4B shows a plan view (xy-plane) of the survey vessel 401 and the wide towed sources 402 and 403 and the sixteen streamers represented by the row of dots in FIG. 4A. Streamer sublines are represented by parallel solid lines located between the streamers. Each streamer subline represents the CMPs for one of the two sources 402 and 403 and the receivers located along a streamer. A streamer subline 420 comprises the CMPs located halfway between the source 402 and receivers located along the streamer 414. For example, a CMP 422 is located along the streamer subline 420 halfway between the free-surface coordinates of the source 402 and a receiver 424 in the streamer 414.

Figure 4C:
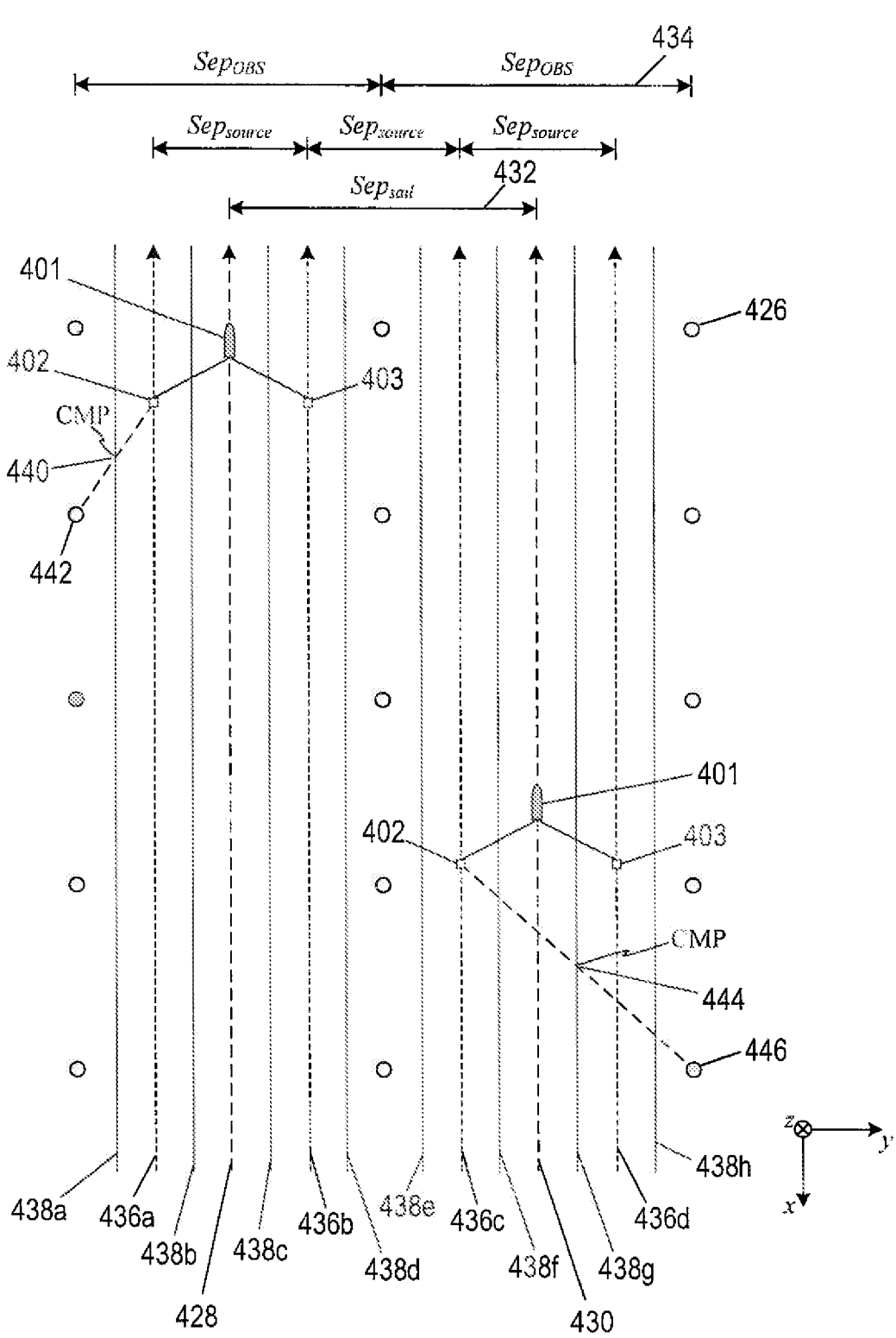

FIG. 4C shows a plan view (xy-plane) of uniformly distributed OBS receivers, uniformly spaced sail lines, uniformly spaced source trajectories, and uniformly spaced OBS receiver sublines in the crossline direction. Shaded circles, such as shaded circle 426, represent OBS receivers disposed on the surface of a subterranean formation. In certain implementations, the OBS receivers may be OBNs that have been positioned at regularly spaced grid points on the formation surface. In other implementations, the OBS receivers may be OBC receivers that have been laid on the formation surface and are electronically connected to a recording survey vessel. Dot-dashed lines 428 and 430 represent adjacent sail lines traveled by the survey vessel 401 towing the wide towed sources 402 and 403 at different times in the marine survey. For the sake of illustrating and describing sail line separation, source separation, and OBS receiver separations, the sixteen streamers towed by the survey vessel 401 in FIG. 4B have been omitted in FIG. 4C. The sail lines 430 and 432 are separated by a sail line separation $Sep_{sail}$ 432. In this example, the OBS receiver separation $Sep_{OBS}$ 434 in the crossline direction equals the sail line separation $Sep_{sail}$ 432 (i.e., $Sep_{OBS}=Sep_{sail}$, where k=1). Dashed lines 436a and 436b represent source trajectories of the sources 402 and 403, respectively, as the survey vessel 401 travels the sail line 428. Dashed lines 436c and 436d represent source trajectories of the sources 402 and 403 as the survey vessel 401 travels the sail line 430 at a different time in the marine survey. Because the sail lines are separated by $Sep_{sail}=2 \times Sep_{source}$, adjacent source trajectories 436a-436d are uniformly spaced by the same source separation $Sep_{source}$ in the crossline direction. For example, source trajectories 436a and 436b are separated by the source separation $Sep_{source}$ and source trajectories 436c and 436d are also separated by the source separation $Sep_{source}$. Even though the source trajectories 436b and 436c are associated with different sail lines 428 and 430, source trajectories 436b and 436c are adjacent and separated by the source separation $Sep_{source}$. OBS receiver sublines are represented by parallel lines 438a-438h. Each OBS receiver subline extends in the inline direction and represents the CMPs for one of the two sources 402 and 403 and the OBS receivers aligned in the inline direction. For example, a CMP 440 is located along the OBS receiver subline 438a halfway between the free-surface coordinates of the source 402 and an OBS receiver 442 and a CMP 444 is located along the OBS receiver subline 438g halfway between the free-surface coordinates of the source 402 and an OBS receiver 446. As the survey vessel 401 travels the adjacent sail lines 430 and 432, the OBS receiver sublines 438a-438h are parallel and uniformly spaced in the crossline direction by one half of the source separation (i.e., $Sep_{source}/2$).

Figure 4D:
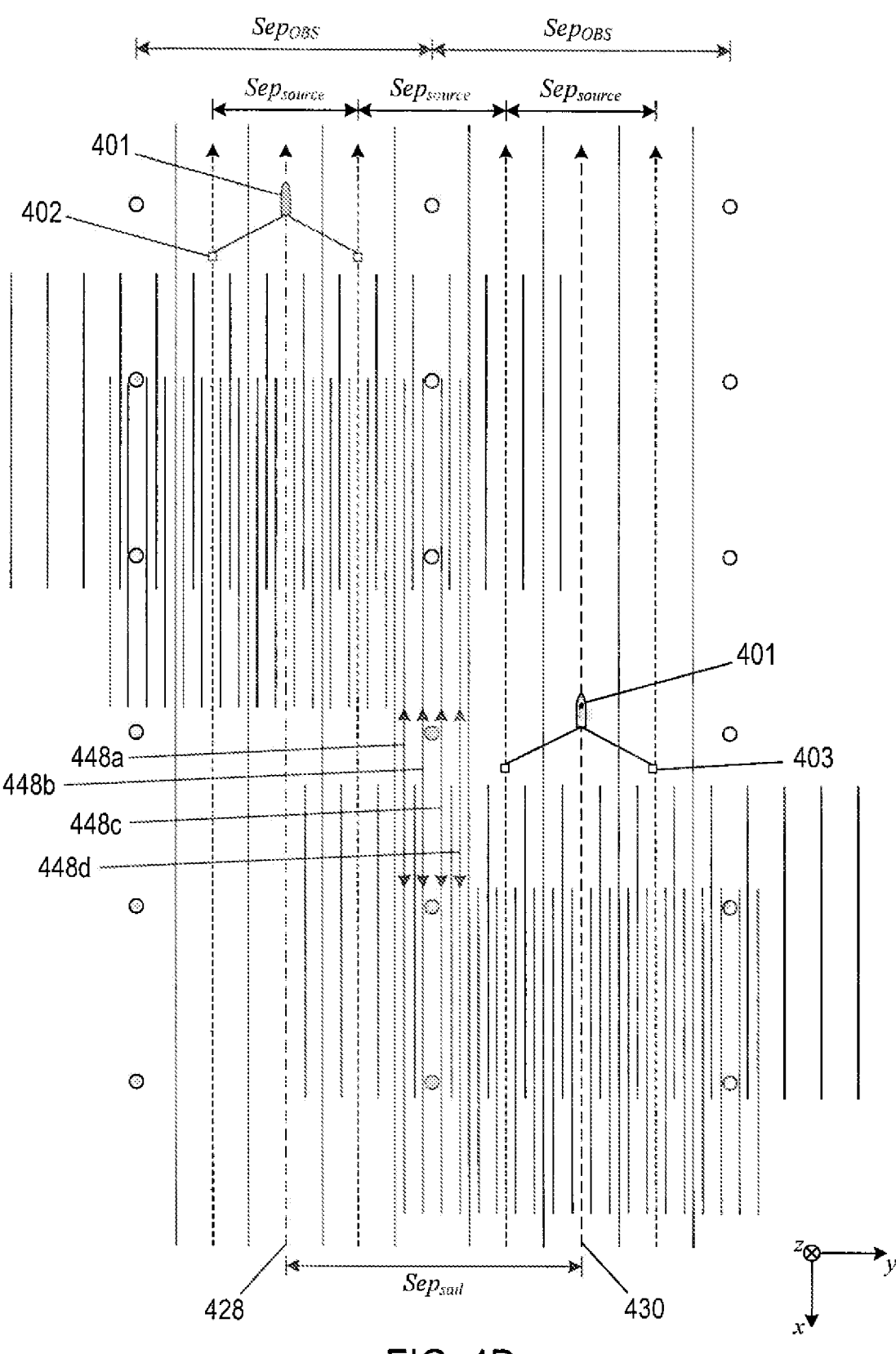

As the survey vessel 401 travels the adjacent sail lines 428 and 430 at different times, overlapping streamer sublines have double the normal fold. In FIG. 4D, the survey vessel 401 tows the wide towed sources 402 and 403 and the sixteen streamers with associated streamer sublines described above with reference to FIG. 4B. Four streamer sublines associated with towing the survey vessel 401 along the sail line 428 are nominally aligned with the streamer sublines associated with towing the survey vessel 401 along the sail line 430 later in the marine survey as represented by directional arrows 448a-448d.

Figure 4E:
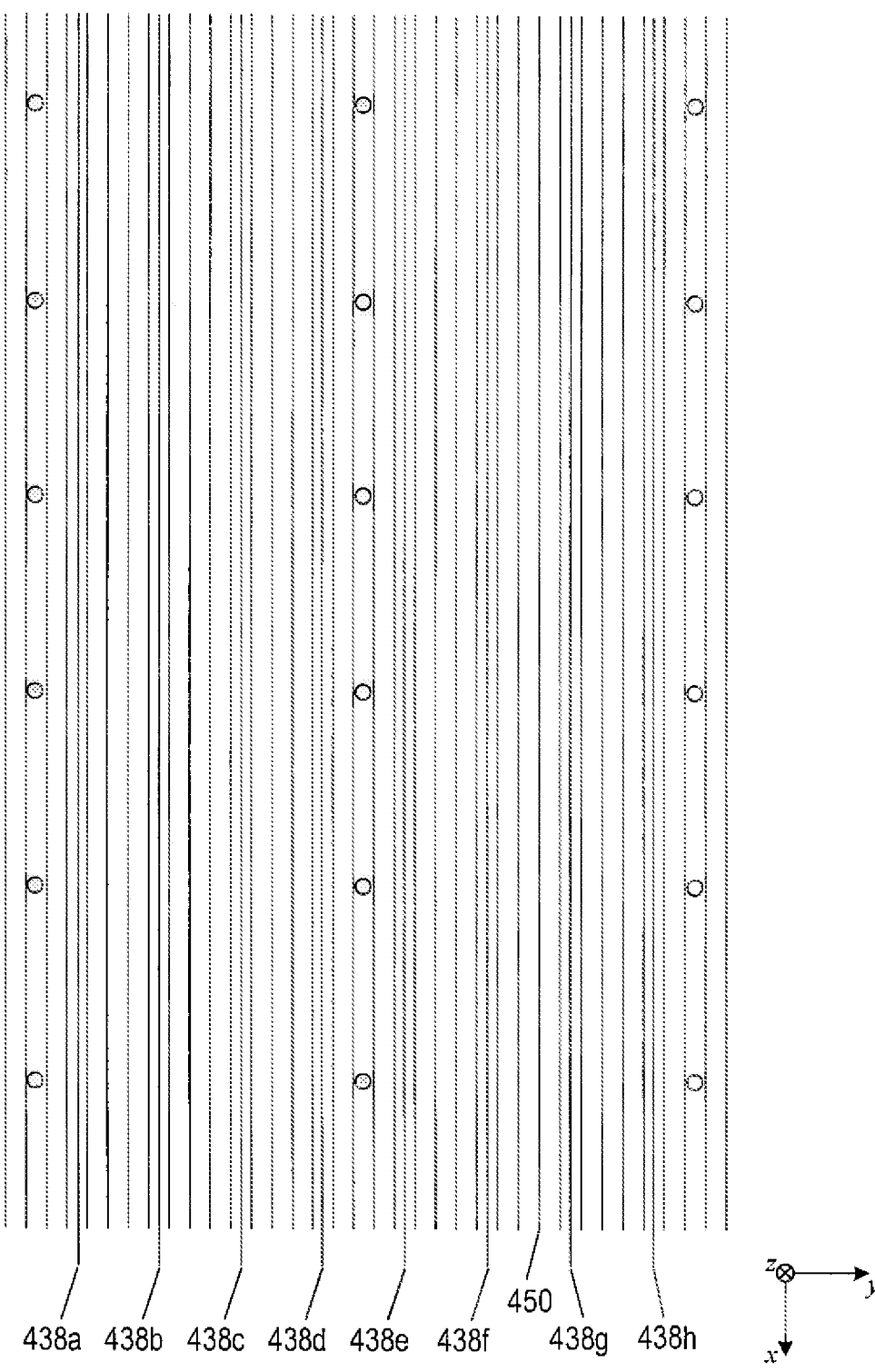

FIG. 4E shows an example of uniformly spaced streamer sublines, such as streamer subline 450 and uniformly spaced OBS receiver sublines 438a-438h in the crossline direction. Overlapping streamer sublines in each sail line are replicated by sublines from the adjacent sail lines. For example, the four central most sublines are overlapping streamer sublines and have double the normal fold. As shown in the example of FIG. 4E, the uniformly spaced streamer sublines are parallel to one another and parallel to the uniformly spaced OBS receiver sublines.

A hybrid marine survey may be performed as illustrated in FIGS. 4A-4E with a streamer separation of about 100 m ($Sep_{stream}=100$ m), a source separation of about 400 m ($Sep_{stream}=400$ m) for two wide towed sources ($N_{source}=2$), resulting in a streamer subline separation of about 50 m (i.e., $Sep_{st-su}=Sep_{stream}/2$). For a source separation of 400 m, the sail line separation and the OSB receiver separation in the crossline direction may both be equal to about 800 m ($Sep_{sail}=Sep_{OBS}=800$ m).

FIGS. 5A-5D show an example of a sail line separation, source separation, and an OBS receiver separation selected for a marine survey performed with a survey vessel towing two wide towed sources and eighteen streamers to obtain parallel uniformly spaced streamer sublines and parallel uniformly spaced OBS receiver sublines in the crossline direction. The streamer spread factor in the sail line separation is n=0.5, which gives approximately 50% overlap of streamer spreads in the area between adjacent sail lines.

Figure 5A:
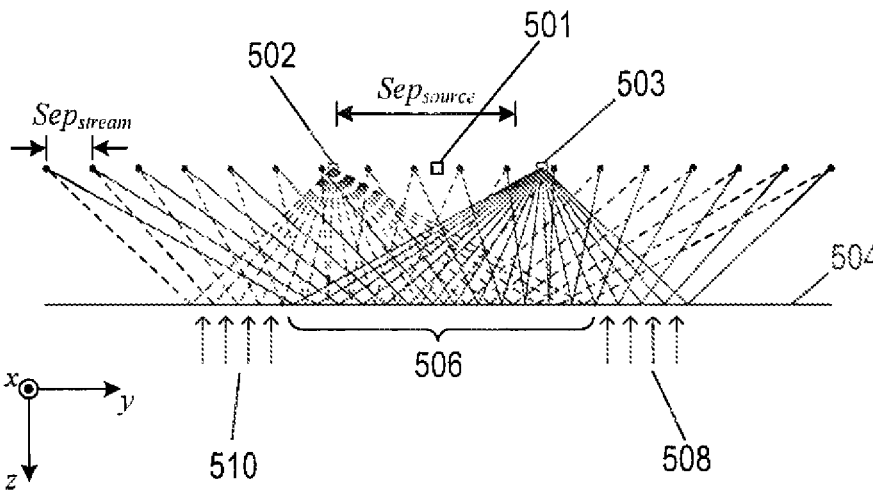
FIGS. 5A-5D show an example of a marine survey performed with two wide towed sources and eighteen streamers to obtain uniformly spaced sublines.

FIG. 5A shows a front or rear (yz-plane) view of a survey vessel 501, two wide towed sources 502 and 503, and eighteen streamers represented by a row of dots. Line 504 represents a hypothetical horizontal reflector in the xy-plane. Dashed line ray paths represent acoustic energy generated by the source 502 and reflected from points on the horizontal reflector 504 with CMPs located halfway between the source 502 and receivers located in streamers. Sold-line ray paths represent acoustic energy generated by the source 503 and reflected from points on the horizontal reflector 504 with CMPs located halfway between the source 503 and receivers located in the streamers. In the region 506, the points of reflections alternate between CMPs associated with the two sources 502 and 503. Empty CMPs are free surface locations where CMPs between one of the sources and receivers located along a streamer are absent, creating gaps between CMPs in the crossline direction. Arrows identify locations that correspond to empty CMPs. For example, arrows 508 and 510 correspond to empty CMPs.

Figure 5B:
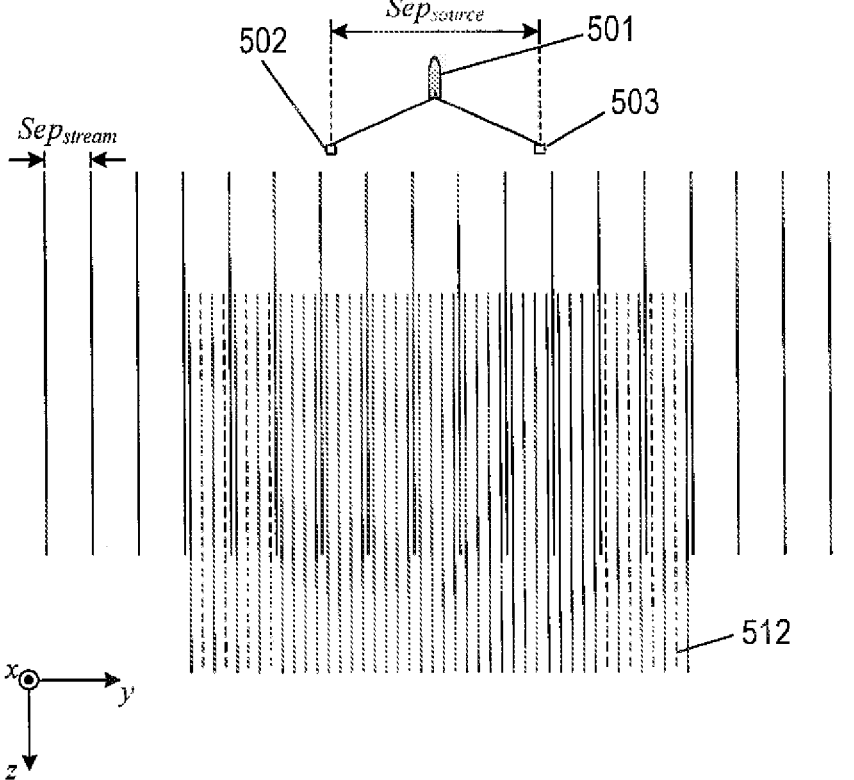

FIG. 5B shows a plan view (xy-plane) of the survey vessel 501 and the wide towed sources 502 and 503 and the eighteen streamers represented by the row of dots in FIG. 5A. Streamer sublines are represented by parallel solid lines located between the streamers. Dashed lines, such as dashed line 512, represent nominally empty streamer sublines that correspond to the empty CMPs in FIG. 5A. For example, nominally empty streamer sublines identified by dashed lines in FIG. 5B correspond to empty CMPs identified by the arrows 508 and 510 in FIG. 5A.

Figure 5C:
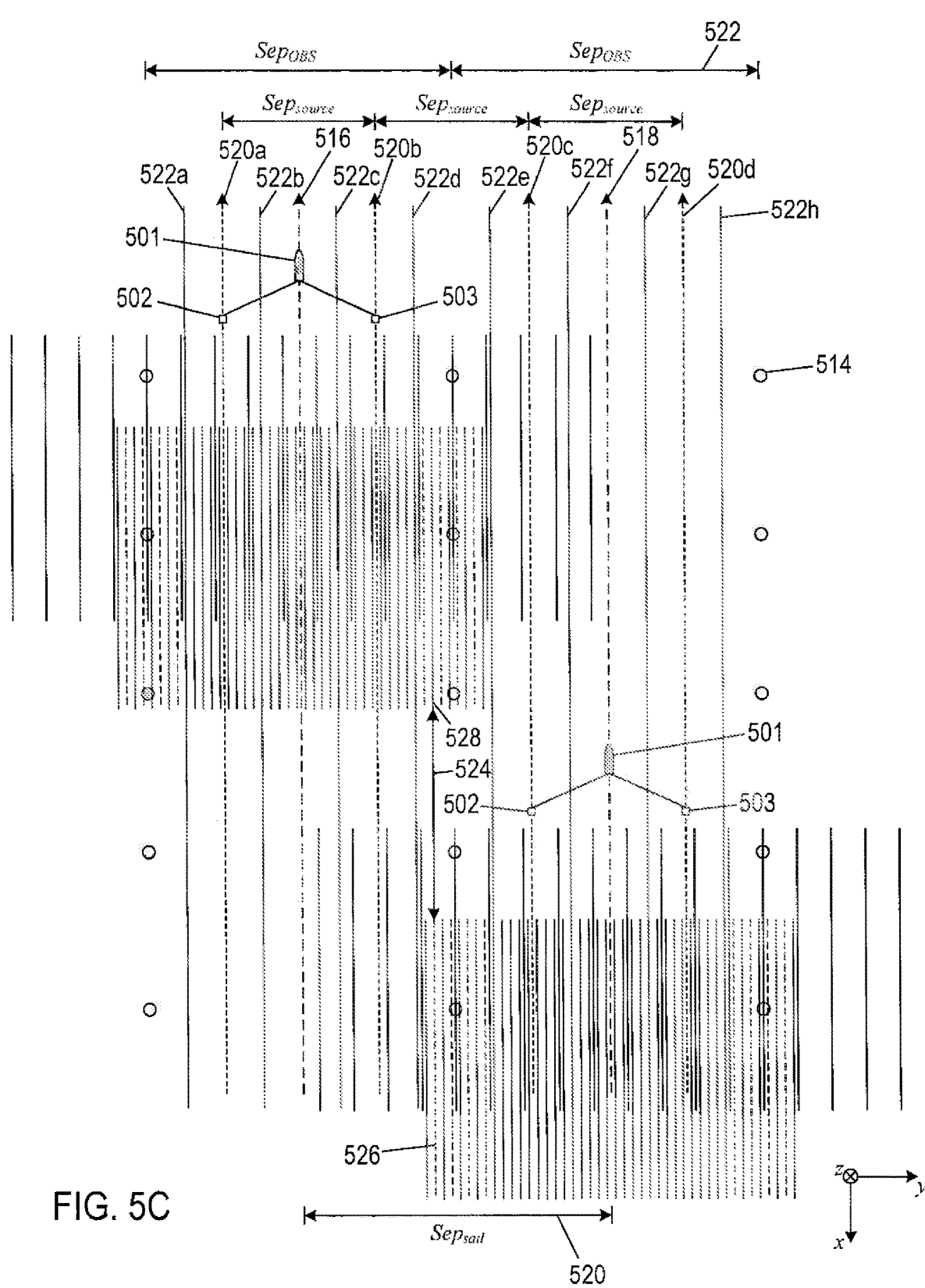

FIG. 5C shows a plan view (xy-plane) of uniformly distributed OBS receivers, uniformly spaced sail lines, uniformly spaced source trajectories, and uniformly spaced OBS receiver sublines in the crossline direction. Shaded circles, such as shaded circle 514, represent OBS receivers disposed on the surface of a subterranean formation. In certain implementations, the OBS receivers may be OBNs that have been positioned at regularly spaced grid points on the formation surface. In other implementations, the OBS receivers may be OBC receivers that have been laid on the formation surface and are electronically connected to a recording survey vessel. Dot-dashed lines 516 and 518 represent adjacent sail lines traveled by the survey vessel 501 towing the wide towed sources 502 and 503 and eighteen streamers at different times in the marine survey. The sail lines 516 and 518 are separated by a sail line separation $Sep_{sail}$ 520. In this example, the OBS receiver separation $Sep_{OBS}$ 522 in the crossline direction equals the sail line separation $Sep_{sail}$ 520 (i.e., $Sep_{OBS}=Sep_{sail}$, where k=1). Dashed lines 520a and 520b represent source trajectories of the sources 502 and 503, respectively, as the survey vessel 501 travels the sail line 516. Dashed lines 520c and 520d represent source trajectories of the sources 502 and 503 as the survey vessel 501 travels the sail line 518 at a different time in the marine survey. Because the sail lines are separated by $Sep_{sail}=2\times Sep_{source}$, adjacent source trajectories 520a-520d are uniformly spaced by the same source separation $Sep_{source}$ in the crossline direction. Even though the source trajectories 520b and 520c are associated with different sail lines 516 and 518, source trajectories 520b and 520c are separated by the source separation $Sep_{source}$. OBS receiver sublines are represented by parallel lines 522a-522h. Each OBS receiver subline extends in the inline direction and represents the CMPs for one of the two sources 502 and 503 and the OBS receivers aligned in the inline direction. The OBS receiver sublines 438a-438h are parallel and uniformly spaced in the crossline direction by one half of the source separation (i.e., $Sep_{source}/2$). As the survey vessel 501 travels the adjacent sail lines 516 and 518 at different times, the nominally empty streamer sublines located between the sail lines are filled by non-empty streamer sublines in to create parallel and uniformly spaced streamer sublines. In FIG. 5C, the nominally empty streamer sublines associated with towing the survey vessel 501 along the sail line 516 are aligned with the non-empty streamer sublines associated with towing the survey vessel 501 along the sail line 518. For example, directional arrow 524 identifies alignment of an empty streamer subline 526 with a non-empty streamer subline 528. For the sail line separation $Sep_{sail}$, the empty streamer sublines located within the area between the sail lines 516 and 518 are filled in by streamer sublines associated with the survey vessel 501 traveling adjacent sail line 518, resulting in parallel and uniformly spaced apart streamer sublines in the crossline direction.

Figure 5D:
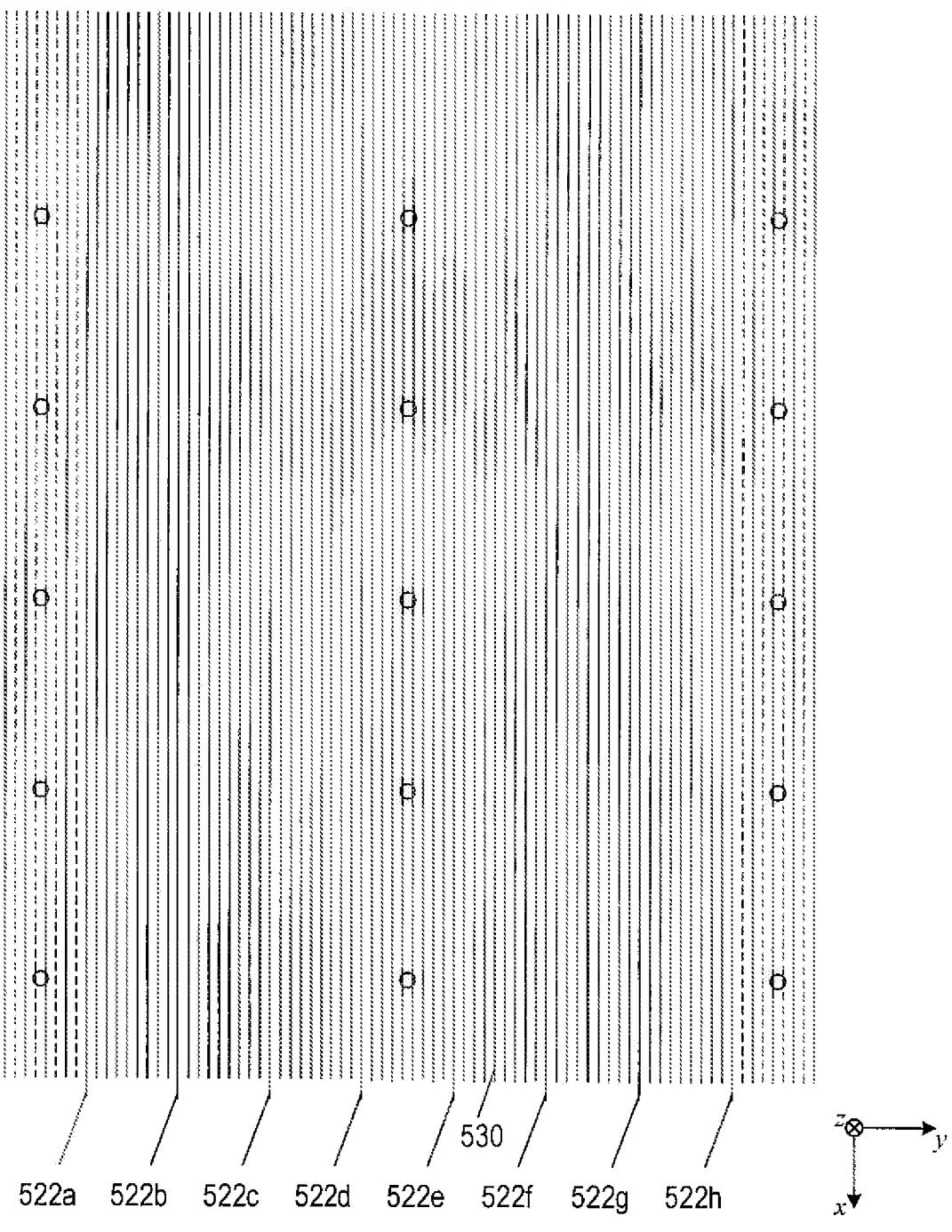

FIG. 5D shows an example of uniformly spaced streamer sublines, such as streamer subline 452 and uniformly spaced OBS receiver sublines 520a-520h in the crossline direction. As shown in the example of FIG. 4E, the uniformly spaced streamer sublines are parallel to one another and parallel to the uniformly spaced OBS receiver sublines.

A hybrid marine survey may be performed as illustrated in FIGS. 5A-5D with a streamer separation of about 100 m ($Sep_{stream}=100$ m), a source separation of about 450 m ($Sep_{source}=450$ m) for two wide towed sources ($N_{source}=2$), resulting in a streamer subline separation of about 25 m (i.e., $Sep_{st-sub}=Sep_{stream}/4$). For a source separation of 450 m, the sail line separation and the OSB receiver separation in the crossline direction may both be equal to about 900 m ($Sep_{sail}=Sep_{OBS}=900$ m).

Marine surveys performed according embodiments described herein are not limited to two wide towed sources and the OBS receiver separation equal to the sail line separation as described above. A survey vessel may tow two or more wide towed sources and the OBS receiver separation in the crossline direction may be increased by two, three, four or more times the sail line separation. The example hybrid marine surveys shown in FIGS. 6-8 below illustrate examples of different sail line and OBS receiver separations and variations in the number of wide towed sources that produce uniform streamer and OBS receiver subline separations in the crossline direction.

Figure 6:
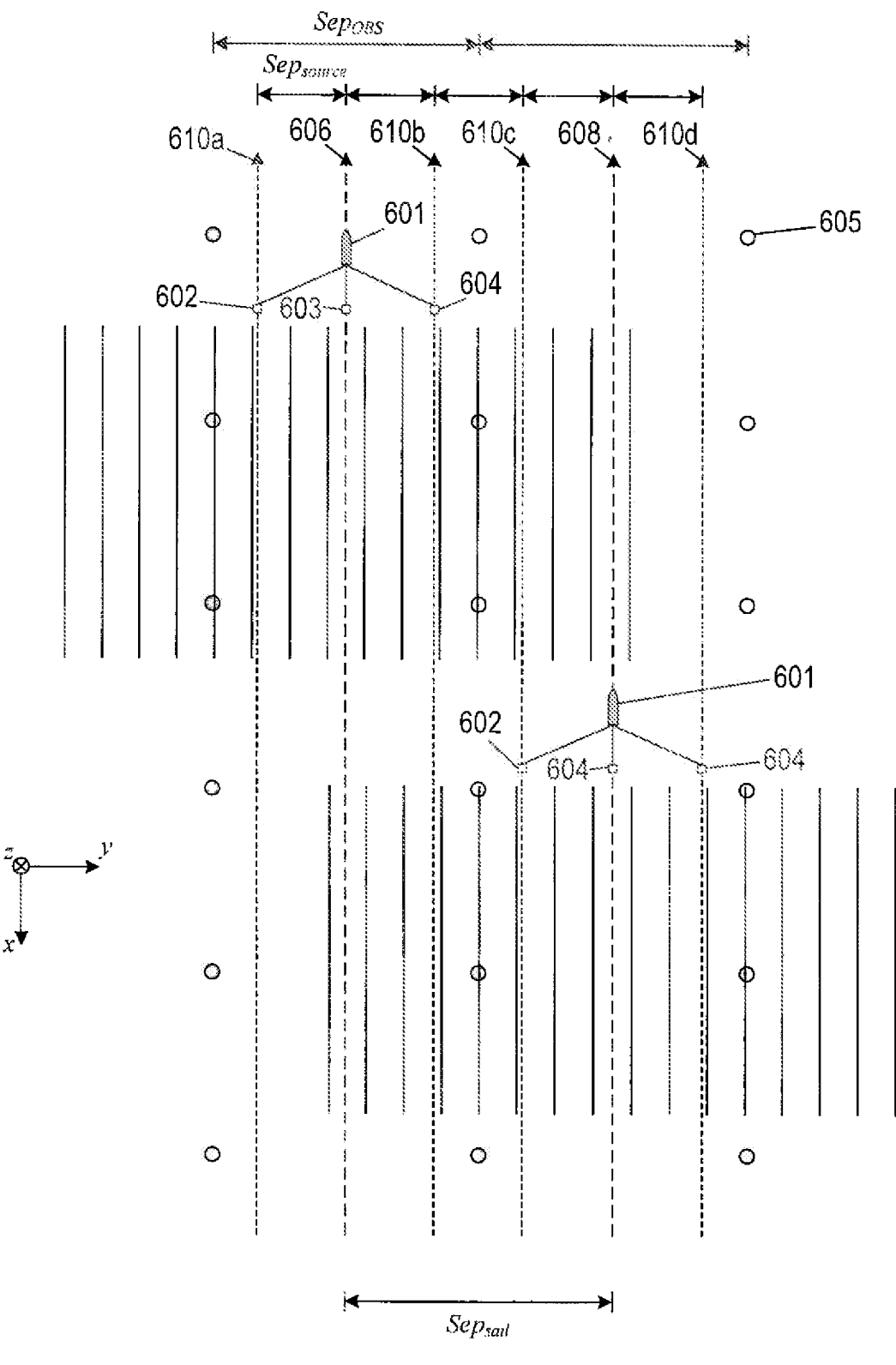
FIG. 6 shows a plan view of an example hybrid marine survey in which a survey vessel tows three wide towed sources and sixteen streamers above an array of OBS receivers.

FIG. 6 shows a plan view (xy-plane) of an example survey vessel 501 towing three wide towed sources 602, 603, and 604 and sixteen streamers above an array of OBS receivers disposed on the surface of a subterranean formation. Shaded circles, such as shaded circle 605, represent OBS receivers of the array of OBS receivers. Dot-dash lines 606 and 608 represent adjacent sail lines. The survey vessel 601 tows the sources 602-604 and the streamers along the two sail lines 606 and 608 at different times in a marine survey. Dashed lines 610a, 610b, 610c, and 610d represent source trajectories of the sources 602 and 604, respectively, with the source trajectory for the middle source 603 overlapping the sail lines 606 and 608. In this example, the sail line separation $Sep_{sail}$ equals the OBS receiver separation $Sep_{OBS}$ in the crossline direction. For the three wide towed sources 602, 603, and 604, the source separations in the crossline direction are $Sep_{source}=Sep_{sail}/3$ and the OBS receiver separation in the crossline direction is $Sep_{OBS}=Sep_{sail}=3\times Sep_{source}$.

Figure 7:
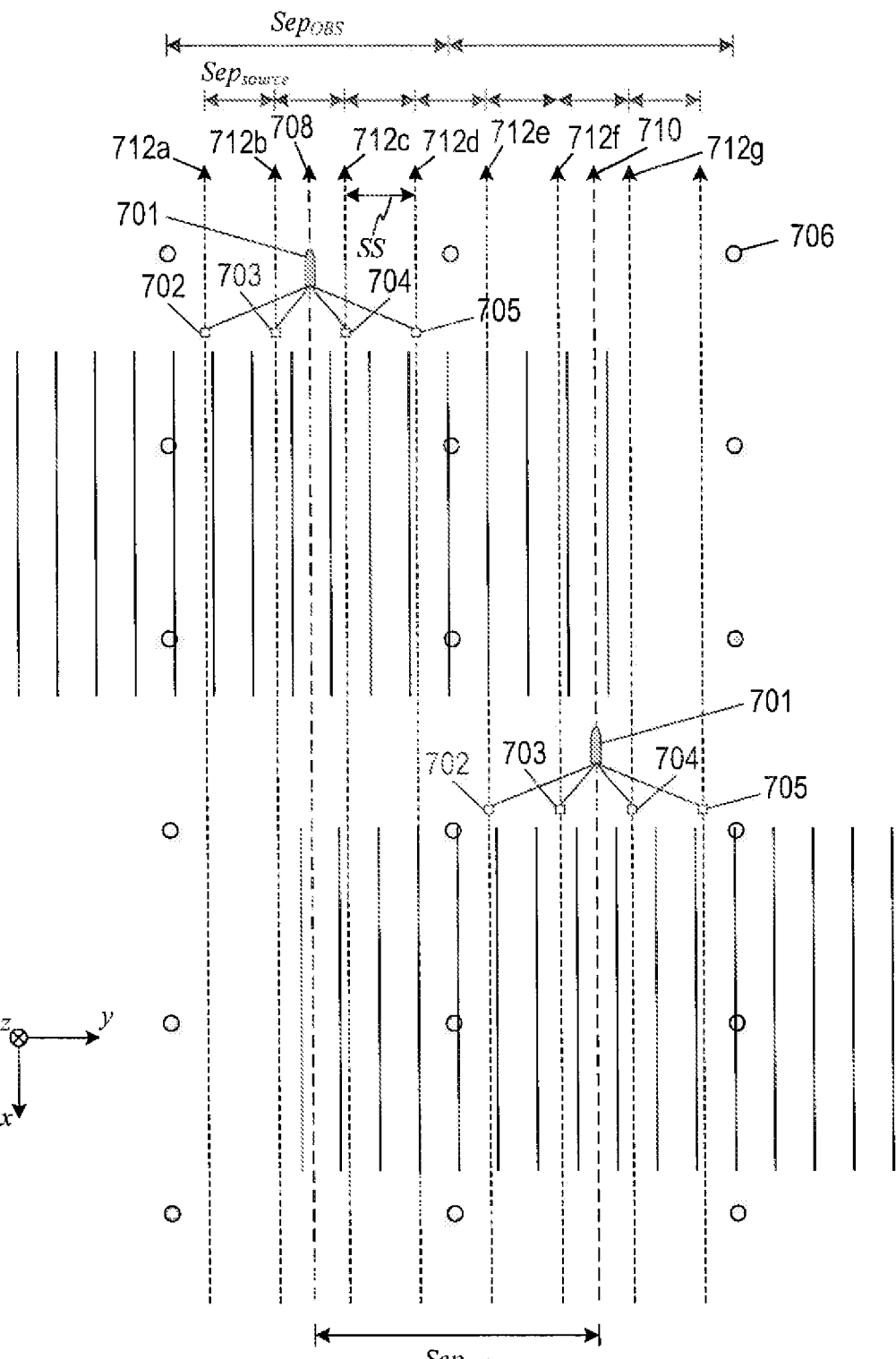
FIG. 7 shows a plan view of an example hydric marine survey in which a survey vessel tows four wide towed sources and sixteen streamers above an array of OBS receivers.

FIG. 7 shows a plan view (xy-plane) of an example survey vessel 701 towing four wide towed sources 702, 703, 704, and 705 and sixteen streamers above an array of OBS receivers disposed on the surface of a subterranean formation. Shaded circles, such as shaded circle 705, represent OBS receivers of the array of OBS receivers. Dot-dash lines 706 and 708 represent adjacent sail lines. The survey vessel 701 tows the sources 702-705 and the streamers along the two sail lines 706 and 708 at different times in a marine survey. Dashed lines 712a-712d represent source trajectories of the four sources 702-705 as the survey vessel 701 travels the sail line 706. Dashed lines 712e-712h represent source trajectories of the four sources 702-705 as the survey vessel 701 travels the sail line 708. In this example, the sail line separation equals the OBS receiver separation in the crossline direction. For the four wide towed sources 702-705, the source separations in the crossline direction are $Sep_{source}=Sep_{sail}/4$ and the OBS receiver separation in the crossline direction is $Sep_{OBS}=Sep_{sail}=4\times Sep_{source}$.

Figure 8:
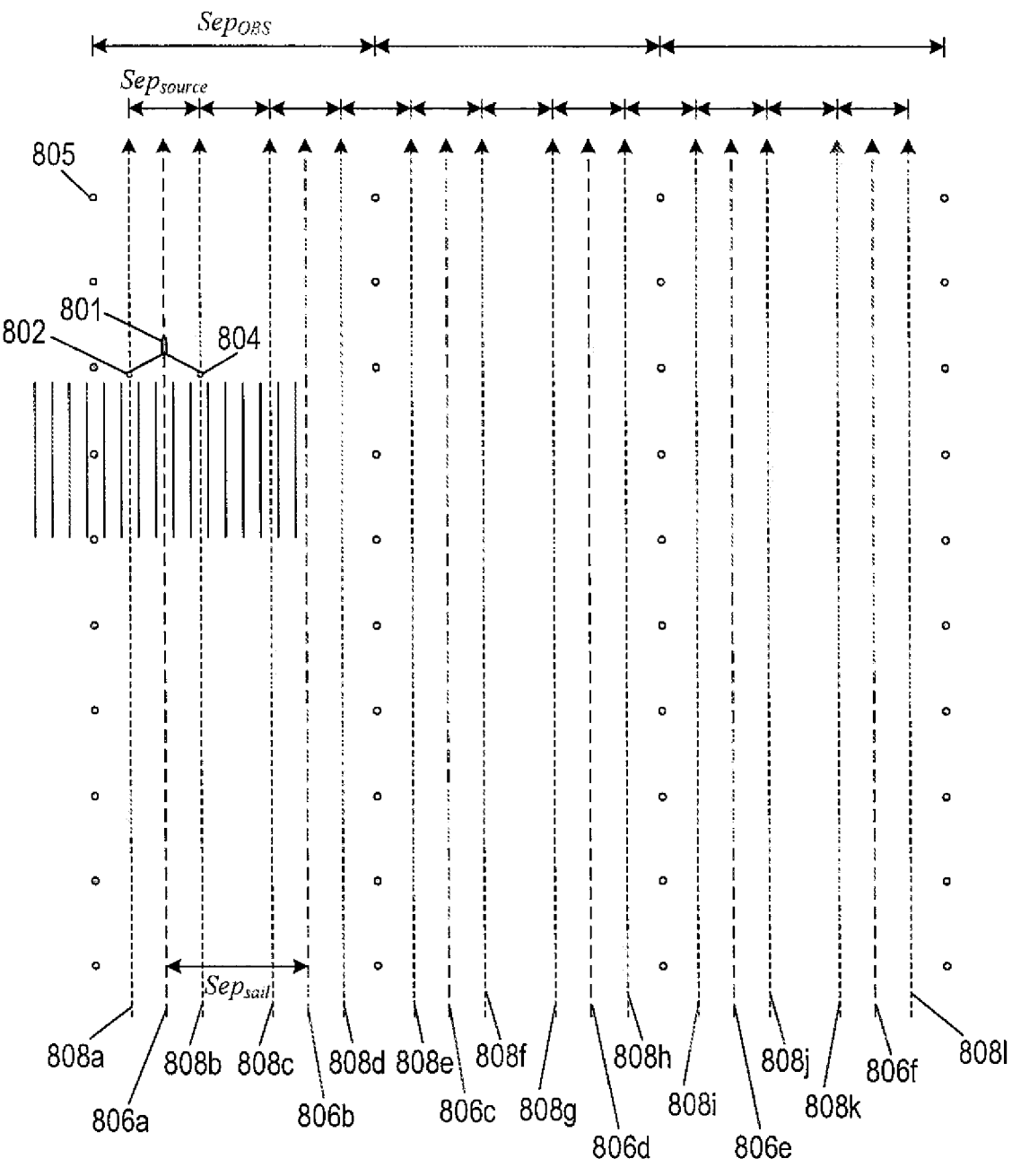
FIG. 8 shows a plan view of a hybrid marine survey in which a survey vessel tows two wide towed sources and sixteen streamers above an array of OBS receivers.

FIG. 8 shows a plan view (xy-plane) of a survey vessel 801 towing two wide towed sources 802 and 804 and sixteen streamers above an array of OBS receivers disposed on the surface of a subterranean formation. Shaded circles, such as shaded circle 805, represent OBS receivers of the array of OBS receivers. Dot-dash lines 806a-806f represent adjacent sail lines traveled by the survey vessel 801 at different times in a marine survey. Dashed lines 808a-808l represent source trajectories of the two wide towed sources 802 and 804. In this example, the OBS receiver separation is twice the sail line separation in the crossline direction (i.e., $Sep_{OBS}=2\times Sep_{sail}$). For the two wide towed sources 802 and 804, the source separations in the crossline direction are $Sep_{source}=Sep_{sail}/2$ and the OBS receiver separation in the crossline direction is $Sep_{OBS}=2\times Sep_{sail}=4\times Sep_{source}$.

In other implementations, the OBS receivers of an array of OBS receivers may be deployed on the surface of a subterranean formation with an OBS receiver separation in the crossline direction given by $Sep_{OBS}=0.5\times(k+1)\times Sep_{sail}$ to obtain uniform streamer and OBS receiver sublines as described above. For example, the OBS receivers may be separated in the crossline direction by $1.5\times Sep_{sail}$, $2.5\times Sep_{sail}$, and $3.5\times Sep_{sail}$.

Figure 9:
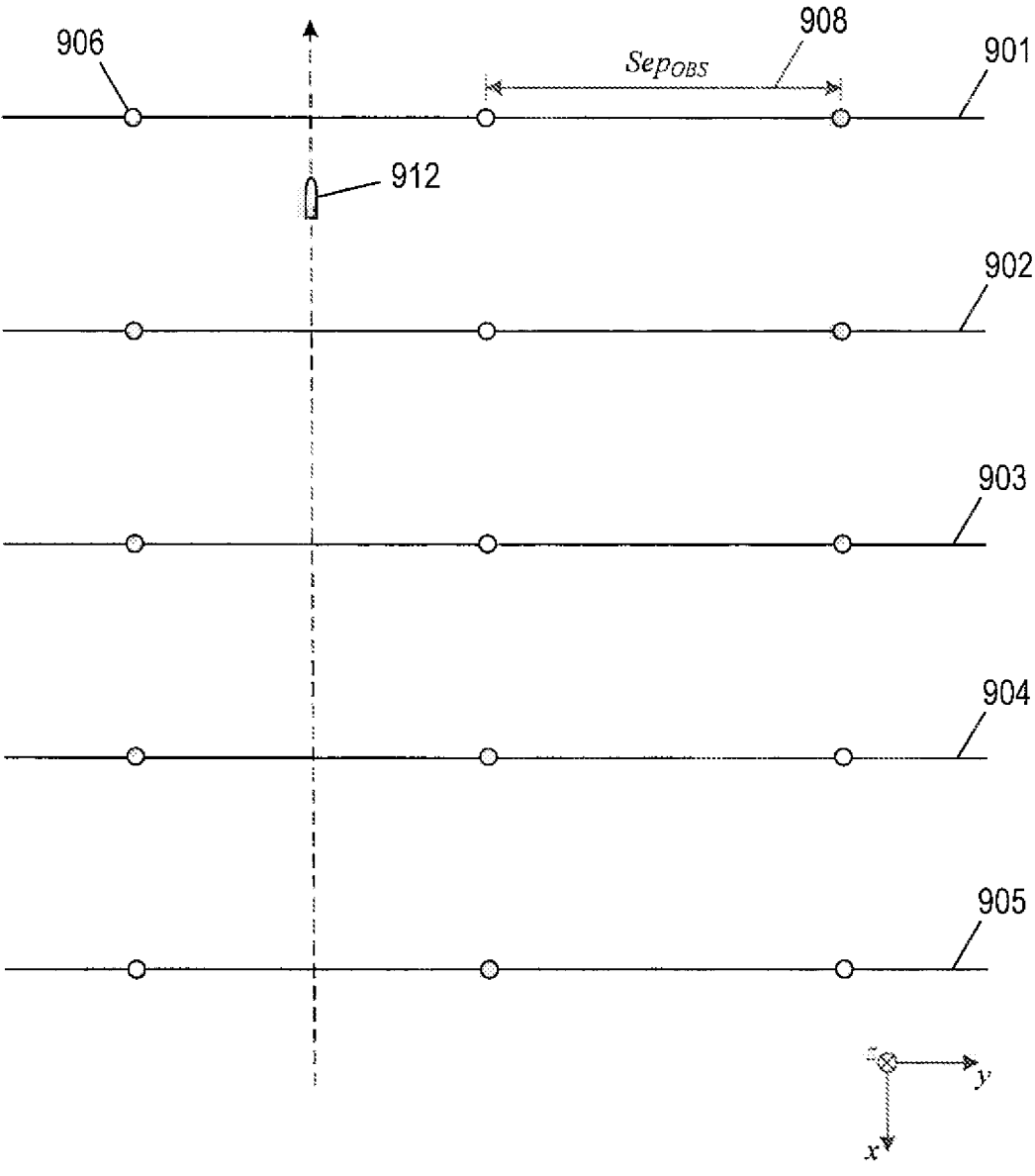
FIG. 9 shows a plan view (xy-plane) of a hybrid marine survey performed with cross shooting.

In certain implementations, a hybrid marine survey may be performed with cross shooting in which a survey vessel tows wide towed sources and streamers nominally perpendicular to a parallel arrangement of OBCs or nodes on a rope deployed on a subterranean formation. FIG. 9 shows a plan view (xy-plane) of a hybrid marine survey performed with cross shooting. Lines 901-905 represent five OBCs or represent cables connecting OBNs to form five sets of nodes on a rope. OBS receivers distributed along the cables are represented by shaded circles, such as shaded circle 906. Each cable is configured with the same OBS receiver separation $Sep_{OBS}$ 908. In this example, the cables are deployed nominally parallel to one another in the crossline direction and with OBS receivers aligned in the inline direction. As a result, the OBS receivers are deployed on a regular uniform grid. Dot-dashed arrow 910 represents a sail line traveled by a survey vessel 912. The wide towed sources and streamers towed by the survey vessel 912 are not shown for the sake of illustration. A hybrid marine survey performed with the OBCs or nodes on a rope and a survey vessel towing wide towed sources and streamers as shown in FIG. 9 gives uniform streamer and OBS receiver sublines as described above.

Figure 10:
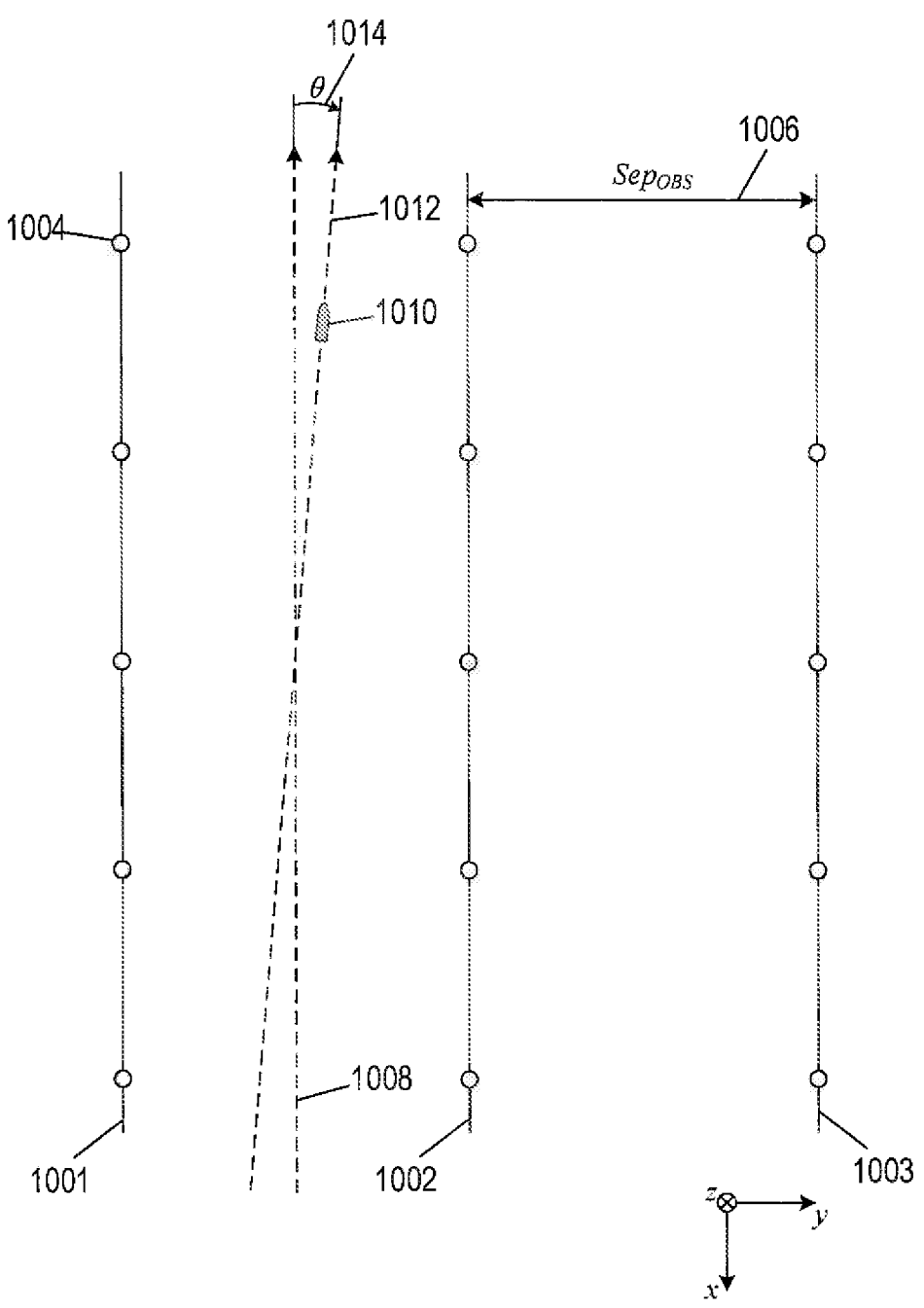
FIG. 10 shows a plan view (xy-plane) of a hybrid marine survey performed with parallel shooting.

In other implementations, a hybrid marine survey may be performed with parallel shooting in which a survey vessel tows wide towed sources and streamers nominally parallel to a parallel arrangement of OBCs or nodes on a rope deployed on a subterranean formation. FIG. 10 shows a plan view (xy-plane) of a hybrid marine survey performed with parallel shooting. Lines 1001-1003 represent three OBCs or represent cables connecting OBNs to form three sets of nodes on a rope. OBS receivers distributed along the cables are represented by shaded circles, such as shaded circle 1004. The cables 1001-1003 are deployed nominally parallel to one another in the inline direction and with the same OBS receiver separation $Sep_{OBS}$ 1006 in the crossline direction. Dot-dashed arrow 1008 represents an ideal sail line oriented parallel to the cables 1001-1003. With parallel shooting, a survey vessel may travel the ideal sail line 1008 towing wide towed sources and streamers oriented parallel to the cables 1001-1003. However, with parallel shooting such an arrangement is not necessary. If a survey vessel 1010 towing wide towed sources (not shown) and streamers (not shown) travels a sail line 1012 oriented at a crooked angle θ 1014 with respect to the ideal sail line 1008, then to ensure uniform streamer subline and OBS receiver subline geometries, the sail lines are oriented parallel to the sail line 1012 with a sail line separation between adjacent sail lines given by $Sep_{crooked} = Sep_{OBS} \cos \theta$.

FIG. 11A shows a table that summarizes relationships described above between OBS receiver separations and source separations in the crossline direction for a selected sail line separation. Each table entry contains an OBS receiver separation and a source separation that may be used in a marine survey and are determined based on the selected sail line separation. Entries in each row represent different OBS receiver separations as multiples of the sail line separation for a fixed number of sources and a fixed source separation in the crossline direction. Entries in each column represent different source separations for different numbers of sources in the crossline direction and a fixed OBS receiver separation.

FIG. 11B shows a table that summarizes relationships described above between sail line separation and source separations in the crossline direction for a selected OBS receiver separation in the crossline direction. Each table entry contains a sail line separation and a source separation that may be used in a marine survey and are determined based on a selected OBS receiver separation in the crossline direction. Entries in each row represent different sail line separations and source separations in the crossline direction for a fixed number of sources and a selected OBS receiver separation in the crossline direction. Entries in each column represent different source separations and a sail line separation for a fixed OBS receiver separation in the crossline direction.

FIG. 12 shows a method for performing a marine survey of a subterranean formation. In block 1201, a sail line separation in a crossline direction is determined for the marine survey based on an average streamer separation and number of streamers selected for the marine survey. In block 1202, an array of OBS receivers is deployed on a surface of the subterranean formation. The OBS receivers are spaced apart in the crossline direction by an OBS receiver separation that is based on the sail line separation. In block 1203, two or more wide towed sources and multiple streamers are towed above the array of OBS receivers in sail lines in an inline direction. The sail lines are spaced apart in the crossline direction with a sail line separation that is based on the OBS receiver separation. In block 1204, the wide towed sources are activated as the wide towed sources and streamers are towed above the array of OBS receivers. In block 1205, wavefields reflected from the subterranean formation are recorded at the OBS receivers and the receivers located in the streamers as seismic data.

FIG. 13 shows a method for performing a marine survey of a subterranean formation. In block 1301, a sail line separation in a crossline direction is determined for sail lines of a marine survey based on an average streamer separation and number of streamers selected for the marine survey. In block 1302, a source separation in the crossline directed is determined for two or more wide towed sources based on the sail line separation and a selected number of wide towed sources. In block 1303, an array of OBS receivers is deposited on a surface of the subterranean formation. The OBS receivers are spaced apart in the crossline direction by an OBS receiver separation that is based on the sail line separation. In block 1304, two or more wide towed sources and the streamers are towed above the array of OBS receivers in an inline direction and in sail lines separated in the crossline direction by the sail line separation. In block 1305, the wide towed sources are activated as the wide towed sources and streamers are towed above the array of OBS receivers. In block 1306, wavefields reflected from the subterranean formation are recorded at the OBS receivers and the receivers located in the streamers as seismic data.

The methods and systems disclosed herein may be used to manufacture a geophysical data product indicative of certain properties of a subterranean formation. A geophysical data product may be manufactured by using the methods and systems described herein to generate geophysical data and store the geophysical data in a computer-readable medium. The geophysical data may be pressure data, vertical velocity data, hydrophone data, or geophone data and any image of a subterranean formation computed from the seismic data recorded using the methods and systems described herein. The geophysical data product may be produced offshore (i.e., by equipment on the survey vessel 102) or onshore (i.e., at a computing facility on land), or both.

It is appreciated that the previous description of the disclosed embodiments is provided to enable any person skilled in the art to make or use the present disclosure. Various modifications to the embodiments will be apparent to those skilled in the art, and the generic principles defined herein may be applied to other embodiments without departing from the spirit or scope of the disclosure. Thus, the present disclosure is not intended to be limited strictly to the embodiments shown herein but is to be accorded the widest scope consistent with the principles and novel features disclosed herein.

The invention claimed is:

1. A method for performing a marine survey of a subterranean formation, the method comprising:
   determining a sail line separation in a crossline direction based on a uniform source separation between adjacent pairs of two or more wide towed sources in the crossline direction;
   towing the two or more wide towed sources and streamers above an array of ocean bottom seismic ("OBS") receivers deployed on the subterranean formation in an inline direction behind a survey vessel that travels sail lines separated in the crossline direction by the sail line separation;

activating the wide towed sources; and recording wavefields reflected from the subterranean formation at the OBS receivers and receivers located in the streamers as seismic data, wherein the OBS receiver separation is greater than a source separation between adjacent sources in the crossline direction of the two or more wide towed sources, and wherein the sail line separation equals the uniform source separation multiplied by a total number of sources of the two or more wide towed sources.

2. The method of claim 1 wherein towing the two or more wide towed sources and streamers above the array of OBS receivers in the inline direction comprises:

determining the source separation between the adjacent sources of the wide towed sources based on the sail line separation divided by the number of sources; and towing the wide towed sources in the inline direction along source trajectories separated by the source separation.

3. The method of claim 1 wherein towing the two or more wide towed sources and streamers above the array of OBS receivers in the inline direction comprises:

determining the source separation between the adjacent sources of the wide towed sources based on the OBS receiver separation and the number of sources; and towing the wide towed sources in the inline direction along source trajectories separated by the source separation.

4. The method of claim 1 wherein towing the two or more wide towed sources and streamers behind the survey vessel in the sail lines comprises:

towing the two or more wide towed sources and streamers behind the survey vessel along a first sail line of the sail lines;

towing the two or more wide towed sources and streamers behind the survey vessel along a second sail line adjacent to the first line such that streamer sublines are aligned with empty streamer sublines.

5. The method of claim 1 wherein towing the two or more wide towed sources and streamers above the array of OBS receivers comprises towing the two or more wide towed sources such that streamer sublines are uniformly spaced apart in the crossline direction and OBS receiver sublines are uniformly spaced apart in the crossline direction.

6. A method for performing a marine survey of a subterranean formation, the method comprising:

deploying ocean bottom seismic ("OBS") receivers in a grid on the subterranean formation with the OBS receivers aligned in a crossline direction and aligned in an inline direction;

determining a sail line separation in the crossline direction based on a uniform source separation between adjacent pairs of two or more wide towed sources in the cross direction towing two or more wide towed sources and streamers above the OBS receivers in the inline direction behind a survey vessel along sail lines separated in the crossline direction by the sail line separation;

activating the wide towed sources; and recording wavefields reflected from the subterranean formation at the OBS receivers and receivers located in the streamers as seismic data, wherein the OBS receiver separation is greater than the uniform source separation between adjacent sources in the crossline direction of the two or more wide towed sources, and wherein the sail line separation equals the uniform source separation multiplied by a total number of sources of the two or more wide towed sources.

7. The method of claim 6 wherein the sail lines are substantially parallel to the OBS receivers aligned in the inline direction.

8. A method for performing a marine survey of a subterranean formation, the method comprising:

deploying an array of ocean bottom seismic ("OBS") receivers on the subterranean formation;

determining a sail line separation in a crossline direction;

towing two or more wide towed sources with a uniform source separation between adjacent pairs of the two or more wide towed sources in the crossline direction and streamers above the array of OBS receivers in an inline direction behind a survey vessel along sail lines separated in the crossline direction by the sail line separation; activating the wide towed sources; and recording wavefields reflected from the subterranean formation at the OBS receivers and receivers located in the streamers as seismic data, wherein the OBS receiver separation in the crossline direction is greater than the uniform source separation, and wherein the sail line separation equals the uniform source separation multiplied by a total number of sources of the two or more wide towed sources.

9. The method of claim 8 wherein the sail lines are substantially parallel to the OBS receivers aligned in the inline direction.

10. The method of claim 8 further comprises:

determining a source separation between adjacent wide towed sources based on the sail line separation divided by the number of sources; and towing the two or more wide towed sources in the inline direction along source trajectories separated by the source separation.

11. The method of claim 8 further comprises:

determining a source separation between adjacent wide towed sources based on the OBS receiver separation and the number of sources; and towing the two or more wide towed sources in the inline direction along source trajectories separated by the source separation.

* * * * *